US008117265B2

(12) United States Patent
Ben-Yoseph

(10) Patent No.: US 8,117,265 B2
(45) Date of Patent: Feb. 14, 2012

(54) IDENTIFYING AND USING IDENTITIES DEEMED TO BE KNOWN TO A USER

(75) Inventor: Roy Ben-Yoseph, Ashburn, VA (US)

(73) Assignee: AOL Inc., Dulles, VA (US)

( * ) Notice: Subject to any disclaimer, the term of this patent is extended or adjusted under 35 U.S.C. 154(b) by 1382 days.

(21) Appl. No.: 10/747,682

(22) Filed: Dec. 30, 2003

(65) Prior Publication Data
US 2004/0193684 A1 Sep. 30, 2004

Related U.S. Application Data

(60) Provisional application No. 60/457,320, filed on Mar. 26, 2003, provisional application No. 60/488,376, filed on Jul. 21, 2003.

(51) Int. Cl.
*G06F 15/16* (2006.01)
(52) U.S. Cl. .......................... 709/206; 709/204; 709/205
(58) Field of Classification Search .................. 709/203, 709/204, 206, 207, 223
See application file for complete search history.

(56) References Cited

U.S. PATENT DOCUMENTS

| 6,073,138 | A | 6/2000 | de l'Etraz et al. | |
|---|---|---|---|---|
| 6,175,831 | B1 | 1/2001 | Weinreich et al. | |
| 6,195,354 | B1 * | 2/2001 | Skalecki et al. | 370/395.32 |
| 6,374,290 | B1 | 4/2002 | Scharber et al. | |
| 6,389,372 | B1 | 5/2002 | Glance et al. | |
| 6,393,464 | B1 * | 5/2002 | Dieterman | 709/206 |
| 6,615,241 | B1 | 9/2003 | Miller et al. | |
| 6,643,641 | B1 | 11/2003 | Snyder | |
| 6,708,205 | B2 | 3/2004 | Sheldon et al. | |
| 6,839,735 | B2 * | 1/2005 | Wong et al. | 709/204 |
| 6,839,737 | B1 * | 1/2005 | Friskel | 709/206 |
| 6,895,426 | B1 | 5/2005 | Cortright et al. | |
| 6,920,478 | B2 * | 7/2005 | Mendiola et al. | 709/203 |
| 6,990,628 | B1 | 1/2006 | Palmer et al. | |
| 7,133,898 | B1 | 11/2006 | Malik | |
| 7,181,498 | B2 * | 2/2007 | Zhu et al. | 709/206 |
| 7,188,143 | B2 * | 3/2007 | Szeto | 709/206 |
| 7,200,634 | B2 * | 4/2007 | Mendiola et al. | 709/204 |

(Continued)

FOREIGN PATENT DOCUMENTS

CN 1348296 A 5/2002

(Continued)

OTHER PUBLICATIONS

Online! Feb. 1, 2003, pp. 1-2, XP002297111, Webpage of Slipstick Systems: To add addresses automatically to Microsoft Outlook Contacts, http://web.archive.org/web/20030201082058/http://www.slipstick.com/contacts/addauto.htm> retrieved on Sep. 17, 2004! the whole document.

(Continued)

*Primary Examiner* — Kenny Lin
*Assistant Examiner* — Shaq Taha
(74) *Attorney, Agent, or Firm* — Finnegan, Henderson, Farabow, Garrett & Dunner, LLP

(57) ABSTRACT

The people a user is presumed to know or be associated with may be determined using a number of techniques. This information about people that the user knows is used in relation to the user's communications. For example access to a user's online presence may be restricted based on the known people such that access to presence is provided only to those people that the user knows.

43 Claims, 16 Drawing Sheets

U.S. PATENT DOCUMENTS

| | | | |
|---|---|---|---|
| 7,206,814 B2 | 4/2007 | Kirsch | |
| 2002/0083136 A1 | 6/2002 | Whitten, II | |
| 2002/0091667 A1 | 7/2002 | Jaipuria et al. | |
| 2003/0009385 A1* | 1/2003 | Tucciarone et al. | 705/26 |
| 2003/0009698 A1 | 1/2003 | Lindeman et al. | |
| 2003/0023692 A1 | 1/2003 | Moroo | |
| 2003/0028595 A1 | 2/2003 | Vogt et al. | |
| 2003/0037112 A1 | 2/2003 | Fitzpatrick et al. | |
| 2003/0045272 A1 | 3/2003 | Burr | |
| 2003/0078981 A1* | 4/2003 | Harms et al. | 709/206 |
| 2003/0083046 A1 | 5/2003 | Mathis | |
| 2003/0110212 A1 | 6/2003 | Lewis | |
| 2003/0167324 A1 | 9/2003 | Farnham et al. | |
| 2003/0188263 A1 | 10/2003 | Bates et al. | |
| 2003/0191969 A1* | 10/2003 | Katsikas | 713/201 |
| 2003/0200272 A1* | 10/2003 | Campise et al. | 709/206 |
| 2003/0212745 A1* | 11/2003 | Caughey | 709/206 |
| 2003/0233418 A1 | 12/2003 | Goldman | |
| 2004/0054733 A1* | 3/2004 | Weeks | 709/206 |
| 2004/0054735 A1* | 3/2004 | Daniell et al. | 709/206 |
| 2004/0059781 A1 | 3/2004 | Yoakum et al. | |
| 2004/0117451 A1 | 6/2004 | Chung | |
| 2004/0122901 A1* | 6/2004 | Sylvain | 709/206 |
| 2004/0177119 A1* | 9/2004 | Mason et al. | 709/206 |
| 2004/0199581 A1* | 10/2004 | Kucharewski et al. | 709/204 |
| 2004/0220897 A1 | 11/2004 | Bernhart et al. | |
| 2004/0243844 A1 | 12/2004 | Adkins | |
| 2004/0255122 A1 | 12/2004 | Ingerman et al. | |
| 2005/0055340 A1 | 3/2005 | Dresden | |
| 2005/0086305 A1* | 4/2005 | Koch et al. | 709/206 |
| 2005/0160144 A1* | 7/2005 | Bhatia | 709/206 |
| 2005/0188044 A1* | 8/2005 | Fleming, III | 709/206 |
| 2005/0198173 A1* | 9/2005 | Evans | 709/206 |
| 2006/0036701 A1* | 2/2006 | Bulfer et al. | 709/206 |

FOREIGN PATENT DOCUMENTS

| | | |
|---|---|---|
| DE | 10048653 A1 | 4/2002 |
| WO | WO 02/28046 A2 | 4/2002 |

OTHER PUBLICATIONS

International Search Report dated Jan. 27, 2005 for International Application No. PCT/US2004/009422, International Filing Date Mar. 26, 2004.

Written Opinion dated Jan. 27, 2005 for International Application No. PCT/US2004/009422, International Filing Date Mar. 26, 2004.

Office Action issued in U.S. Appl. No. 10/747,678 mailed Dec. 15, 2008, 18 pages.

Office Action issued in CN Application No. 200480013443.9, mailed Mar. 6, 2009, including English Translation, 20 pages.

Office Action issued in U.S. Appl. No. 10/747,263 mailed Mar. 5, 2008, 18 pages.

Office Action issued in U.S. Appl. No. 10/747,263 mailed Sep. 5, 2008, 14 pages.

Notice of Allowance issued in U.S. Appl. No. 10/747,263, mailed Jun. 2, 2009, 8 pages.

Office Action issued in U.S. Appl. No. 10/747,651 mailed Mar. 5, 2008, 20 pages.

Office Action issued in U.S. Appl. No. 10/747,651, mailed Feb. 20, 2009, 27 pages.

Office Action issued in U.S. Appl. No. 10/747,676 mailed Mar. 31, 2008, 24 pages.

Office Action issued in U.S. Appl. No. 10/747,678 mailed Mar. 27, 2008, 15 pages.

Office Action issued in U.S. Appl. No. 10/747,678 mailed Jun. 12, 2008, 12 pages.

Notice of Allowance issued in U.S. Appl. No. 10/747,678, mailed Jun. 5, 2009, 8 pages.

"Degrees of Separation Email Spam Protection", http://www.halfbakery.com, pp. 1-3.

Joanna Glasner, "Social Nets Find Friends in VCs", Nov. 17, 2003, pp. 1-3, available at http://www.wired.com/news/print/0,1294,61227,00.html.

Julian Byrne, "My Spamblock was thwarting UCE address culling programs", news.admin.net-abuse.e-mail, Jan. 19, 1997.

Leander Kahney, "Will You Buy a Car From This Man?", Oct. 6, 2003, pp. 1-3, available at http://www.wired.com/news/print/0,1294,60703,00.html.

Office Action issued in U.S. Appl. No. 10/747,676 mailed Sep. 21, 2007, 24 pages.

Office Action issued in U.S. Appl. No. 10/747,678 mailed Sep. 21, 2007, 22 pages.

Paul Mutton, "PieSpy Social Network Bot—Inferring and Visualizing Social Networks on IRC", jibble.org, http://lister.linux-srv.anlx.net/piespy, © 2001-2004, pp. 1-18.

U.S. Appl. No. 10/747,263, filed Dec. 30, 2003 published as U.S. Publication No. 2004/0205126 dated Oct. 14, 2004.

U.S. Appl. No. 10/747,651, filed Dec. 30, 2003, published as U.S. Publication No. 2004/0210639 dated Oct. 21, 2004.

U.S. Appl. No. 10/747,676, filed Dec. 30, 2003 published as U.S. Publication No. 2004/0205127 dated Oct. 14, 2004.

U.S. Appl. No. 10/747,678, filed Dec. 30, 2003, 51 pages.

Uhura7, "Re: being invisible to all but one person on your list", alt.chat-programs.icq, Feb. 29, 2000.

Zephyr on Athena (AC-34), http://web.mit.edu/olh//Zephyr/Revision.html, 24 pages.

* cited by examiner

Member Directory Search Results

AOL Member Directory

Search Results

Items 1 - 20 of over 100 matching entries.   Search Again

| Screen Name | Member Name | Location |
|---|---|---|
| DrJoNdOe16 | John Romero aka: | california |
| Happy2cuagain | john doe | sunny, florida |
| Iceman8088 | duke john doe | |
| Muscleman957 | Call me John Doe for | Greenville, North Carolina |
| Player Made Inc2 | John Doe | THE GLASS CITY....., TOLE |
| South couple2 | John & Jane Doe for | alabama |
| TheyCreepUpOnYou | John Doe | Queens, Nyc |
| Biltojr | Bilte, Josh, John | Danville CA (near San Fran) |
| CWat802944 | John Doe??? | Uk |
| Hottbjock28 | John Doe | Baton Rouge, LA |
| Johndoe5879 | John Doe Jr., 39 yrs | San Diego/El Cajon/Californ |
| MorgendasWelt | John | |

= Member is Online

Figure 13

IDENTIFYING AND USING IDENTITIES DEEMED TO BE KNOWN TO A USER

CLAM OF PRIORITY

This application claims priority under 35 USC §119(e) to U.S. Provisional Patent Application Ser. No. 60/457,320, filed on Mar. 26, 2003, and U.S. Provisional Patent Application Ser. No. 60/488,376, filed on Jul. 21, 2003, both of which are hereby incorporated by reference.

TECHNICAL FIELD

This description relates to network communications.

BACKGROUND

With the advent of the Internet and a decline in computer prices, many people are communicating with one another through computers interconnected by networks. A number of different communication mediums have been developed to facilitate such communications between computer users.

SUMMARY

Generally, techniques for providing online presence information are described. A list of people known to a user is maintained. Online presence information for the user is accessed and a potential receiver of the online presence information is determined. The potential receiver is compared to the maintained list to determine if the potential receiver is included on the list. Whether to communicate the online presence information to the potential receiver is determined based on whether the potential receiver is included in the list.

Implementations may include one or more of the following features. For example, determining whether to communicate the online presence information to the potential receiver may include determining to not communicate the online presence information to the potential receiver when the potential receiver is not included in the list.

Determining whether to communicate the online presence information to the potential receiver may include determining whether to communicate the online presence information to an instant messaging application of the potential receiver; determining whether to display the online presence information on a web page; determining whether to display the online presence information in member search results; and/or determining whether to display the online presence information in a member profile.

Determining whether to communicate the online presence information to the potential receiver may include determining whether to communicate the online presence information to the potential receiver when a request for online presence information is received from the potential receiver. Alternatively, determining whether to communicate the online presence information to the potential receiver may include determining whether to communicate the online presence information to the potential receiver absent a request from the potential receiver for the online presence information.

An inference that a person is associated with the user may be made based on positive user actions related to e-mail communications from the person and the inferred person may be added to the list. The positive actions may include sending an e-mail to the person; replying to, forwarding, saving, or printing an e-mail received from the person; moving an e-mail from a first folder to a second folder; or leaving an e-mail from the person open for a predetermined period of time. When the actions include moving an e-mail from a first folder to a second folder, the first folder may be an inbox folder and the second folder may be a folder other than a delete folder or a spam folder.

An inference that a person is associated with the user may be made based, at least in part, on detecting a communication between the user and the person and the inferred person may be added to the list. The communication may be an instant messaging communication.

An inference that a person is associated with the user may be made and the inferring that the person is associated with a user may include accessing a contact list of the user to determine a first contact on the user's contact list; and accessing a contact list of the first contact to determine a second contact on the first contact's contact list.

An inference that a person is associated with the user may be made based, at least in part, on detecting user actions that mitigate against factors that otherwise are used to infer a person is known to the user. The user actions may include the user taking steps to report a communication from the person as spam; add a person to a blacklist; and/or move a communication from the person to either of a spam folder or a delete folder.

The user may be enabled to expressly designate a person as associated with the user and the designated person may be added to the list.

Implementations of the described techniques may include hardware, a method or process, or computer software on a computer-accessible medium.

The details of one or more implementations are set forth in the accompanying drawings and the description below. Other features will be apparent from the description and drawings, and from the claims.

DESCRIPTION OF DRAWINGS

FIGS. 13-15 are illustrations showing environments in which online presence information can be restricted using the list of known people.

DETAILED DESCRIPTION

The people a user is presumed to know or be associated with may be determined using a number of techniques. The user may specify the people known to him manually, for example, by making manual changes to an address book, buddy list, or white list. Alternatively, or additionally, the people known to a user may be inferred by monitoring the actions of the user. For example, people to whom the user sends e-mail may be considered as known to the user. Likewise, saving a message from a person may signal that the user knows that person.

This information about people that the user knows is used in relation to the user's communications. For example, a display of e-mail may only show the user e-mails from known people. The names on the list also may be added to a white list, whereby the list of known people may be used to restrict accepted e-mail to only those people the user knows or otherwise. The list also may be used to restrict instant messages or chat request to only those people who the user knows. In addition, a list of known people may be used to restrict access to a user's presence, such that access to presence may be provided only to those people that the user knows.

Figure 1:
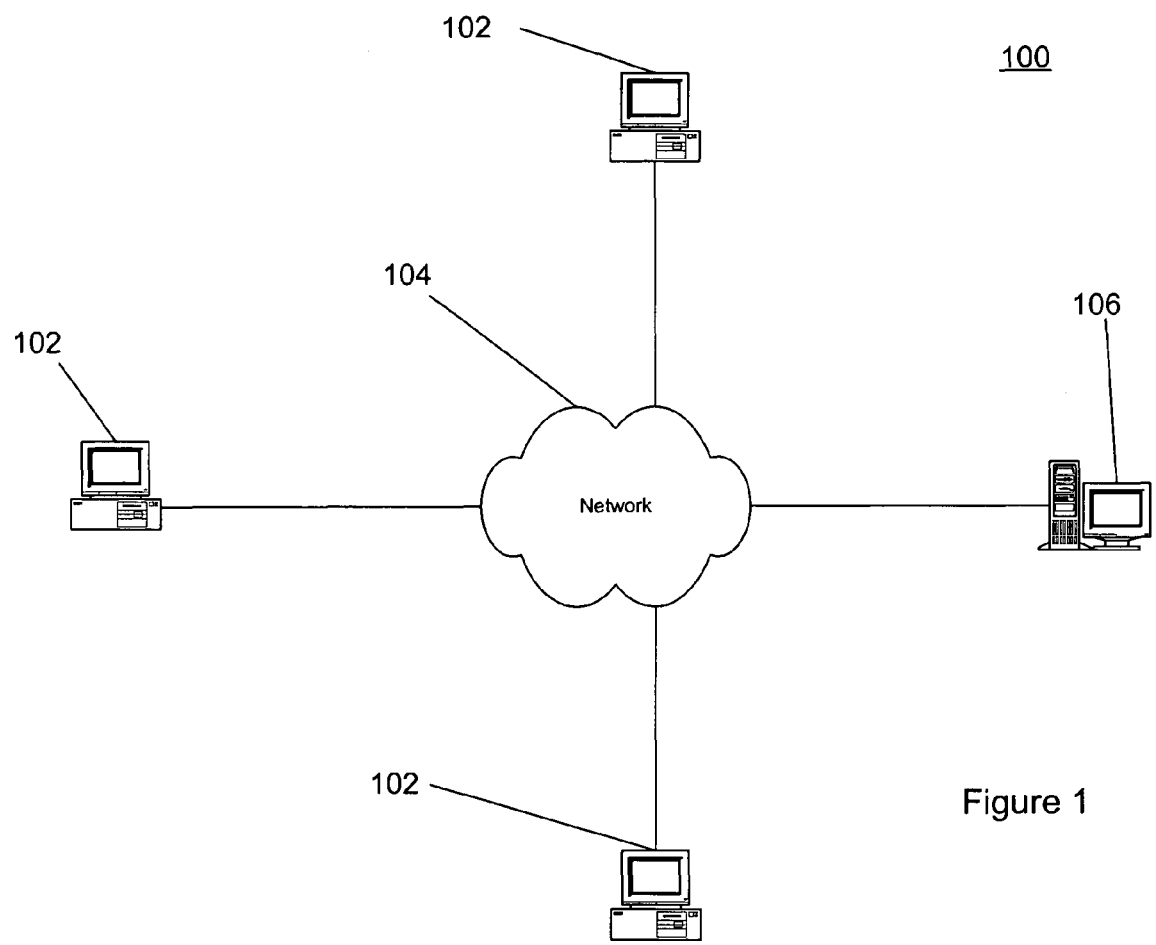
FIG. 1 is a block diagram of an exemplary networked computing environment.

Referring to FIG. 1, an exemplary networked computing environment 100 supports communications between computer users. Computer users are distributed geographically and communicate using client systems 102. A network 104 interconnects client systems 102. Client systems 102 are connected to network 104 through various communication mediums, such as a modem connected to a telephone line (using, for example, serial line internet protocol (SLIP) or point-to-point protocol (PPP)) or a direct internetwork connection (using, for example, transmission control protocol/internet protocol (TCP/IP)).

Each of the client systems 102 may be implemented using, for example, a general-purpose computer capable of responding to and executing instructions in a defined manner, a personal computer, a special-purpose computer, a workstation, a server, a device, a component, or other equipment or some combination thereof capable of responding to and executing instructions. Client systems 102 may receive instructions from, for example, a software application, a program, a piece of code, a device, a computer, a computer system, or a combination thereof, which independently or collectively direct operations, as described herein. These instructions may take the form of one or more communications programs that facilitate communications between the users of client systems 102. For instance, such communications programs may include e-mail programs, instant messaging (IM) programs, file transfer protocol (FTP) programs, and voice over internet protocol (VoIP) programs. The instructions may be embodied permanently or temporarily in any type of machine, component, equipment, storage medium, or propagated signal that is capable of being delivered to the client systems 102.

Client systems 102 include a communications interface (not shown) used by the communications programs to send communications through network 104. The communications may include e-mail, audio data, video data, general binary data, or text data (e.g., encoded in American Standard Code for Information Interchange (ASCII) format). Client systems also include one or more input devices, such as a keyboard, mouse, stylus, or microphone, as well as one or more output devices, such as a monitor, touch screen, speakers, or a printer.

The network 104 typically includes a series of portals interconnected through a coherent system. Examples of the network 104 include the Internet, Wide Area Networks (WANs), Local Area Networks (LANs), analog or digital wired and wireless telephone networks (e.g. a Public Switched Telephone Network (PSTN)), an Integrated Services Digital Network (ISDN), or a Digital Subscriber Line (xDSL)), or any other wired or wireless network. The network 104 may include multiple networks or subnetworks, each of which may include, for example, a wired or wireless data pathway.

A host server 106 also may be connected to network 104 and may be used to facilitate some direct or indirect communications between the client systems 102. As with the client systems 102, host server 106 may be implemented using, for example, a general-purpose computer capable of responding to and executing instructions in a defined manner, a personal computer, a special-purpose computer, a workstation, a server, a device, a component, or other equipment or some combination thereof capable of responding to and executing instructions. Host server 106 may receive instructions from, for example, a software application, a program, a piece of code, a device, a computer, a computer system, or a combination thereof, which independently or collectively direct operations, as described herein. These instructions may take the form of one or more communications programs. For instance, such communications programs may include e-mail programs, IM programs, FTP programs, VoIP programs, etc. The instructions may be embodied permanently or temporarily in any type of machine, component, equipment, storage medium, or propagated signal that is capable of being delivered to the host server 106.

Further, host server 106 includes a communications interface (not shown) used by the communications programs to send communications through network 104. The communications may include e-mail, audio data, video data, general binary data, or text data (e.g., encoded in American Standard Code for Information Interchange (ASCII) format).

Each client system 102 has one or more associated users, and a user of a client system 102 may desire to have aspects of his or her communications with other users controlled based on whether the other users are known. In order to facilitate such control, a list is maintained. The list contains the people the user is presumed to know. The list may be maintained on a client system 102, host server 106, or another device connected to network 104.

The term "people" is used throughout to refer to the entities with which communication occurs. However, communication can occur with entities that are not individual human beings. Communications can occur with a company, an organization, or a system that is not itself a human being. For example, e-mail can be sent to the technical support group at a computer software company. The term "people" is used throughout to more generally refer to all entities with which communications can occur, including entities that are not natural people. In addition, when "people" are described as known, it means that at least one of the various communication identifiers associated with them are known, whether or not the people/entities themselves are actually known.

A communication identifier is an identifier of the "person" used to communicate with the "person". Communication identifiers can be, for example, an address, such as an e-mail address, a screen name, or an internet protocol (IP) address, or it can be a number, such as a telephone number or a VoIP number. In one implementation, these communication identifiers are stored in the list of known people. Storing the communication identifier in the list facilitates easy recognition of communications from a known person, thereby facilitating control over aspects of such communications based on whether the sender is known. Thus, the term "people" or "person" should be understood as having a meaning that includes any identifier of a person or organization.

Figure 2:
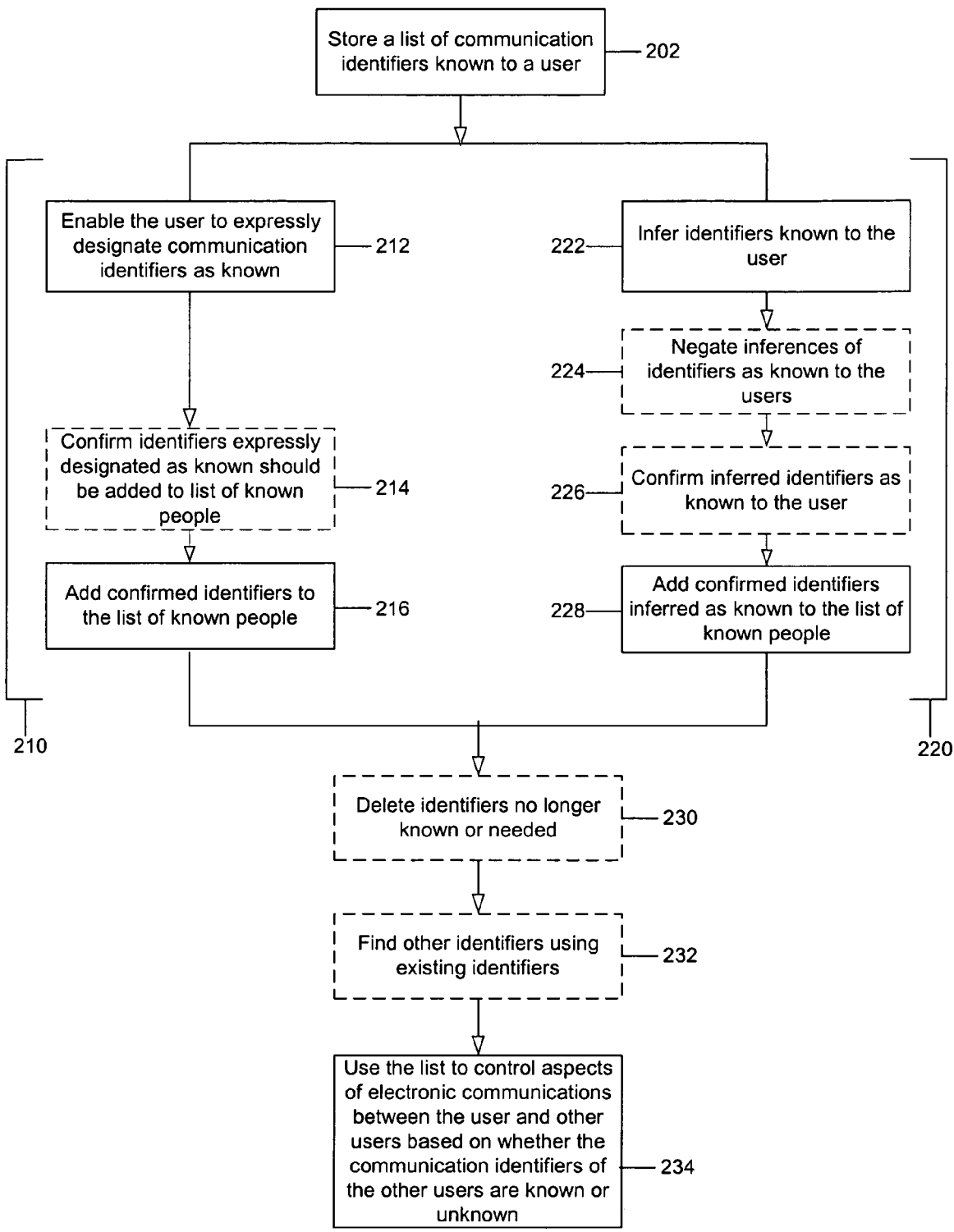
FIG. 2 is a flow chart showing a process for maintaining and using a list of known people.

Referring to FIG. 2, a process 200 is used to maintain and use the list of people known to the user. A list of people known to the user is stored (202). Communication identifiers are stored in the list to indicate the known people.

The user can make manual additions to the list of known people (210). To that end, the user is enabled to expressly designate communication identifiers as known (212). For example, a graphical user interface (GUI) that allows the user to enter communication identifiers may be provided. There may also be a speech-based interface that allows the user to add communications identifiers to the list of known people by saying them. These interfaces may allow the user to augment the list of known people indirectly by allowing them to make additions to a contact list such as, for example, a custom sender list, an address book, or a buddy list.

However, the user may want to manually add a person to a contact list but not to the list of known people. An interface optionally may be presented to enable the user to confirm that the manually entered communication identifiers should be added to the list of known people (214). The confirmation may be enabled by way of a GUI that allows the user to select the entered communication identifiers that the user actually wants to be included in the list of known people. This confirmation may occur after a predetermined number of communication identifiers have been entered, or at login or logoff to seek confirmation of any people entered during the previous online session. Those identifiers that the user confirms then are added to the list (216). When a confirmation interface is not presented, all entered communication identifiers are added to the list of known people. Alternatively, there may be an interface that allows the user to directly enter identifiers into the list of known people.

On the other hand, communication identifiers may be inferred as being known based on the actions of the user (220). First, the communication identifiers known to the user are inferred (222). For example, a communication identifier may be inferred as known if an e-mail message to that communication identifier is sent. When an instant messaging program is used, the communication identifier of the person with whom the user is communicating may be designated as known to the user.

Known communication identifiers may be inferred based on user interactions with a received message. For example, a communication identifier also may be inferred as known if a message from that communication identifier is read, replied to, forwarded, saved, or printed. Likewise, the communication identifier that sent the e-mail message may be designated as known if the message is moved from the "inbox" to a folder that is not marked for deletion or for spam, or if the message is left open for a predetermined amount of time.

Known communication identifiers also may be inferred nased on indicia other than user actions. As an example, the people designated as known to the people the user knows may be designated as being "known" to the user. For instance, if a person B is designated as someone user A knows, then the people designated as known to person B also may be designated as "known" to user A. One way this may be implemented is, for example, to designate the people in an address book and/or buddy list of person B as known to user A.

When inferring known people, some actions may be taken into account to negate an inference that the person is known (224). For instance, if an e-mail received from a person is forwarded to an e-mail address that has been designated for reporting spam, then the inference that the user knows the person may be negated. As another example, an inference that a person is known may be negated if the person is included on an explicit black list of people with which communication should not occur, created by the user or the network administrator.

After known communication identifiers are inferred, an interface optionally may be presented to enable the user to confirm that the inferred communication identifiers are in fact known (226). The confirmation may be enabled by way of a GUI that allows the user to select inferred communication identifiers that the user actually knows or wants to be included in the list of known people. This confirmation may occur after a predetermined number of communication identifiers have been inferred as known, or at login or logoff to seek confirmation of any people identified in the previous online session. Those identifiers that the user confirms then are added to the list (228). When a confirmation interface is not presented, the inferred identifiers are added to the list.

Branches 210 and 220 may occur simultaneously or sequentially. After at least one of the branches has occurred, the user optionally may view the list of known people, and he or she may delete those users that are no longer known or needed (230). In addition, communication identifiers in the list of known people can be used optionally to find other communication identifiers for that person (232). For example, a person's e-mail address may be obtained from a profile associated with a screen name. Similarly, if the e-mail address is known, it may be used to obtain the screen name. The screen name, e-mail, or other determined communication identifiers may be used to determine other ways in which the known person may communicate with the user or in which the user may communicate with the known person.

At this point, the list can be used to control aspects of the electronic communications between the user and other users based on whether the communication identifiers of the other users are known or unknown (234). For example, in an e-mail system that performs spam filtering, the e-mail addresses of known people may be added to a white list, which designates e-mail addresses that should not be filtered or otherwise treated as spam.

The e-mail addresses of the known people also may be used to filter or sort a display of e-mail such that e-mails from people on the list are shown more prominently than e-mails from people not on the list. For instance, the user may be able to indicate that only e-mails from known people are shown. In this case, only e-mails from people on the list of known people are shown in the display of e-mail. Alternatively, or additionally, e-mails from known people may be displayed in bold, while e-mails from people not on the list are not displayed in bold. Another manner of displaying known people prominently includes grouping all of the e-mail from known people in one position of the display, for example, at the beginning or at the end of a list of e-mails.

The e-mail addresses of known people may be used to restrict accepted e-mail to only those people the user knows. Similarly, the IM screen names of known people may be used to restrict instant messages or chat requests to only those people who the user knows.

Further, the list of known people may be used to restrict displays of online presence information t those people on the list. For example, the IM screen names of known people may be used to restrict who can view presence information of the user to those people the user knows. That is, other users may be restricted from viewing whether the user is online unless the other users are people the user knows. Also, some services such as ICQ (which is an instant messaging service) and America Online display online presence information through channels other than an IM buddy list. Such displays of online presence information also may be restricted, as described further below.

Additionally, by determining multiple communication identifiers as described above, aspects of the user's communication on multiple different messaging mediums can be controlled. For example, aspects of the user's communication using a combination of, for example, e-mail and instant messaging clients can be controlled using the list of known people.

Figure 3:
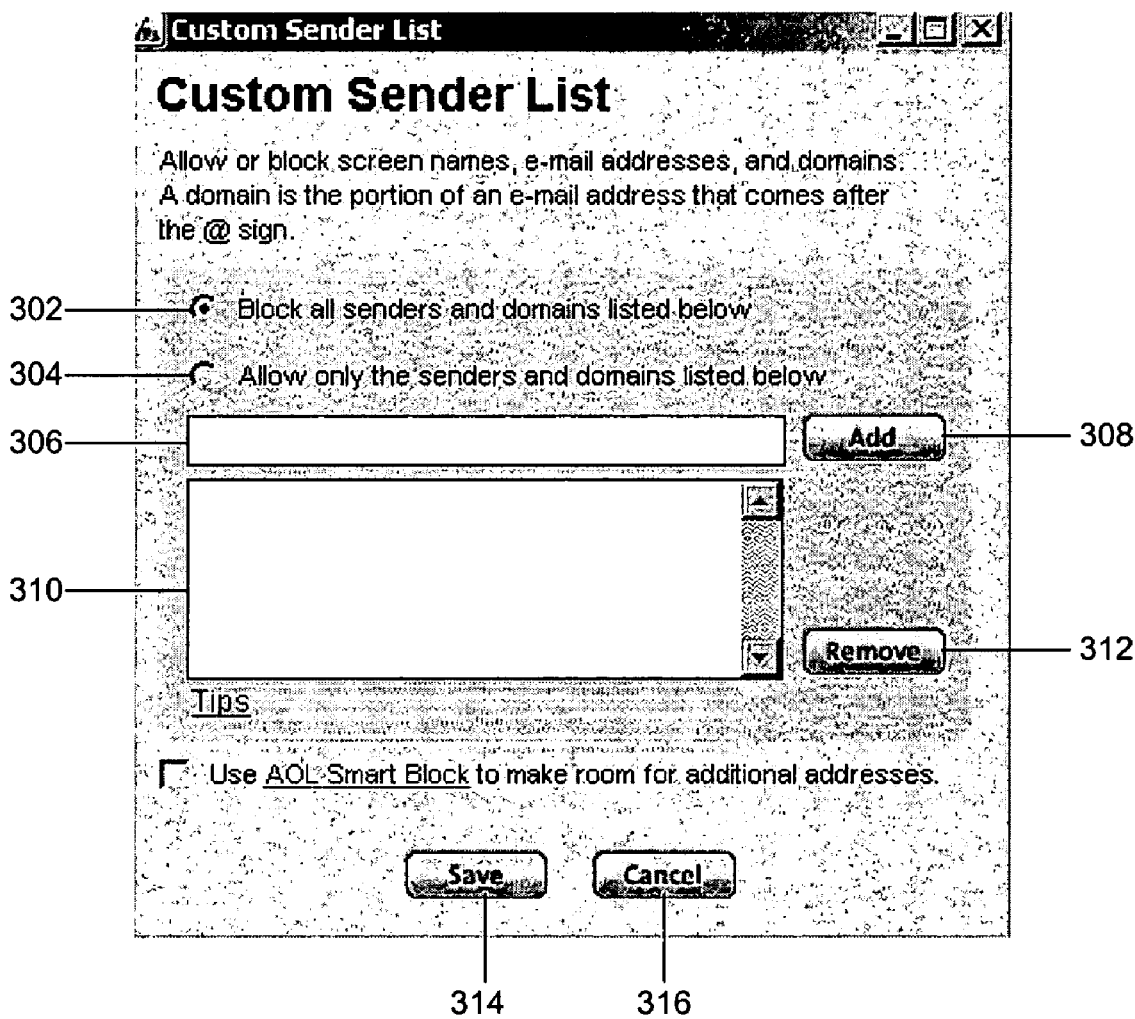
FIG. 3 is an illustration showing an interface for manually specifying white and black lists.
Figure 4:
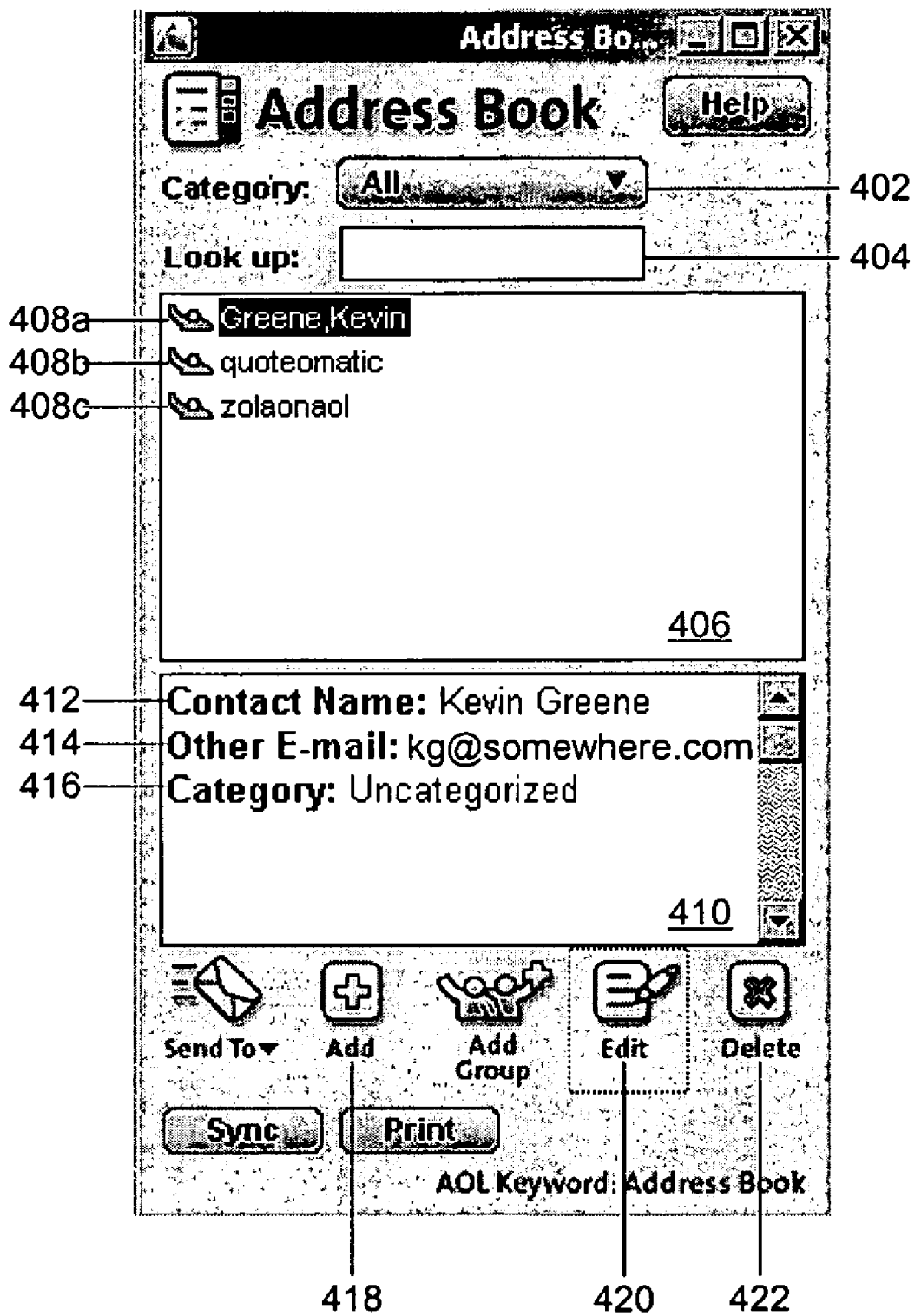
FIG. 4 is an illustration showing an interface for an address book.
Figure 5:
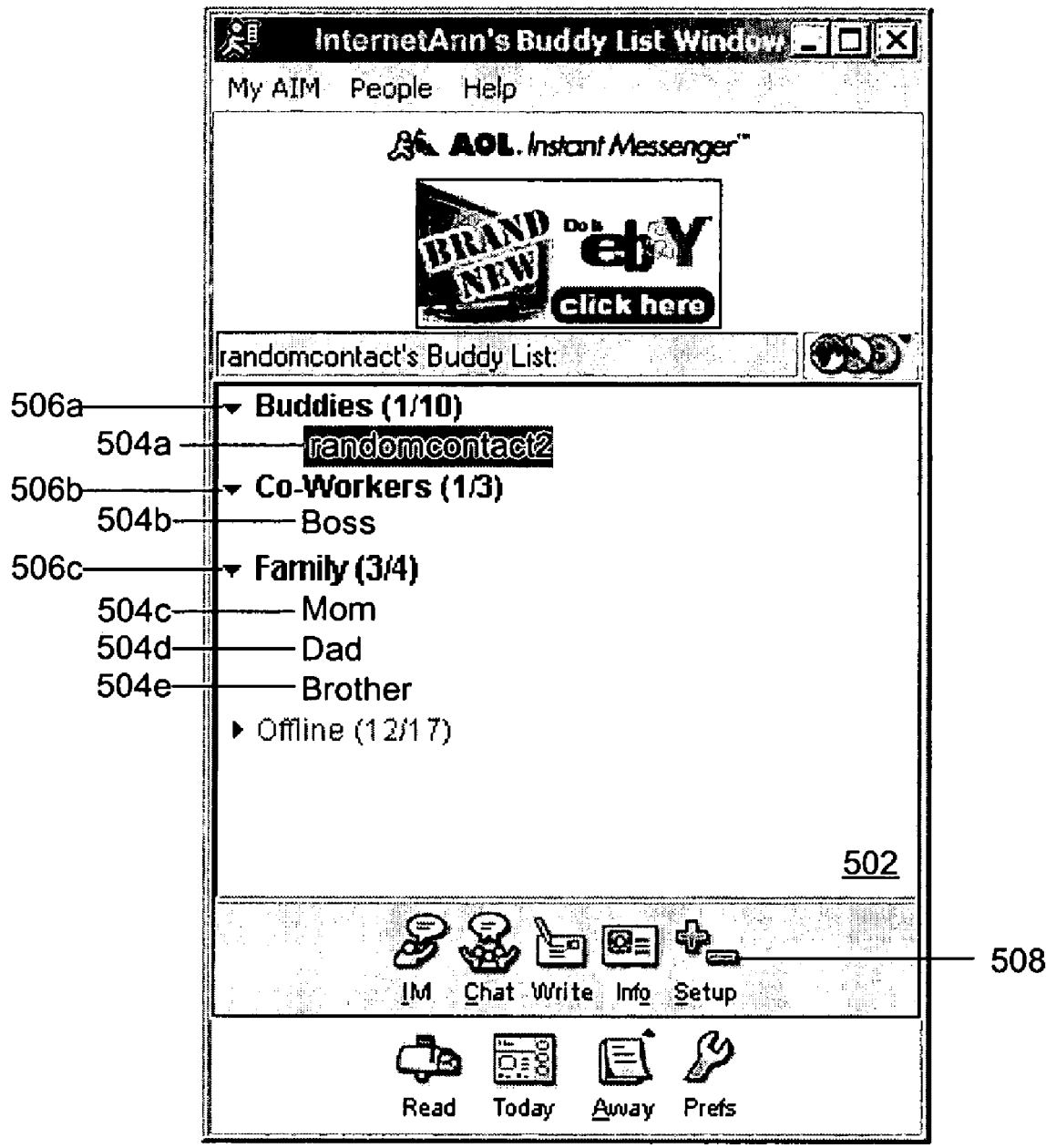
FIG. 5 is an illustration showing an interface for an instant messaging client program.

FIGS. 3-5 show exemplary manners in which known people can be expressly designated by putting them in a contact list. The contact list may be, for example, a white list, an address book, or an instant messaging buddy list. The people added to one or more of the contact lists then are added to the list of known people.

Referring to FIG. 3, a custom sender list interface 300 allows for manual addition of communication identifiers to the list of known people through specification of a white list and a black list. A white list designates the e-mail addresses that should not be filtered such that e-mail messages from those addresses are delivered to the user without, e.g., subjecting the e-mails to spam filtering. On the other hand, a black list designates the e-mail addresses that should be filtered such that e-mail messages from those addresses are treated as spam and are not shown to the user. The custom sender list interface 300 enables the user to expressly designate communication identifiers as known by adding them to the white list. The identifiers placed on the white list then are added to the list of known people.

Selecting radio button 302 signals specification of a black list, while selecting radio button 304 signals specification of a white list. Only one of radio buttons 302 and 304 may be selected at once. A communication identifier can be typed into the text field 306. The communication identifier entered in the text field 306 can be added to the black list or white list, depending on whether radio button 302 or radio button 304 is selected, by clicking on the "Add" button 308. This action will add the entered communication identifier, along with all other previously entered communications identifiers, into the text box 310.

A communication identifier can be selected from the list contained in the text box 310 by clicking on the communication identifier. Subsequently clicking on a "Remove" button 312 will eliminate that communication identifier from the list. Any changes made to the black list or the white list can be saved by clicking on a "Save" button 314, and any changes can be undone and discarded using a "Cancel" button 316.

Referring to FIG. 4, an address book interface 400 allows for manual addition of people to the list of known people through the addition of entries to an address book. Each entry in the address book contains information about a specific person, including the communication identifiers for that person. The address book interface 400 enables the user to expressly designate communication identifiers as known by adding them to entries within the address book. These identifiers are then added to the list of known people. The address book interface 400 may provide the user with an option for preventing the addition of communication identifier to the list of known people when the identifier is added to the address book. The option may prevent the addition for the identifier currently being added, or when the option is selected, may prevent all entered identifiers from being added to the list of known people.

The address book interface 400 contains a contact list 406 in which the contacts in the address book are listed. All entries in a selected category and/or matching a current searching criteria are listed by name in the contact list 406. The contact list 406 illustrated contains three entries, entry 408a for "Kevin Greene," entry 408b for "quoteomatic," and entry 408c for "zolaonaol."

The address book interface 400 also contains a personal information list 410 for displaying the personal information for an entry in the address book. Selecting an entry from those listed in the contact list 406 causes the information for the corresponding person to be displayed in personal information list 410. For example, selecting entry 408a for Kevin Greene lists his personal information in the personal information list 410. The personal information includes his contact name 412 (Kevin Greene), an e-mail address 414 (kg@somewhere.com), and a category 416 (Uncategorized, which means the entry 408a was never placed into a category). Other pieces of information, including other communication identifiers, may be included in the personal information list 410.

Address book interface 400 also includes buttons 418-422 for adding, deleting, and modifying entries in the address book. Entries may be added to the address book by clicking on the "Add" button 418. This will invoke a dialog box in which the necessary information for a new entry in the address book can be entered. Existing entries can also be modified by selecting an entry from those listed in text box 406 and subsequently clicking on the "Edit" button 420. This will invoke a dialog box populated with information from the existing entry. This information can be changed, and information can be added to it. Finally, existing entries can be removed from the address book by selecting an entry from those listed in text box 406 and subsequently clicking on the "Delete" button 422. Any communication identifiers added to the address book through use of the address book interface 400 are considered to be known, so they are added to the list of known people.

Entries in the address book may be filed into different categories. The address book interface enables the user to view all entries in a specific category; it also enables the user to view all entries in the address book, regardless of category. The available categories are listed in a drop down category selection box 402. Selecting a category name from the category selection box 402 will filter the set of entries in the address book to include only those belonging to the selected category. Selecting "All" from the category selection box 402 will include all entries in the address book. The set of entries in the address book can be searched using the search text box 404. The search criteria can be entered into the search text box 404. The set of entries is filtered to contain only those entries meeting the search criteria entered into the search text box 404. The illustrated entries are the total entries may in the address book because the option "All" was selected from the selection box 402, and no search criteria have been entered into search text box 404. Thus the address book only contains the three entries listed in contact list 406.

Referring to FIG. 5, a buddy list interface 500 allows for manual addition of people to the list of known people through addition of screen names to a buddy list. A screen name is a communication identifier for a person in an instant messaging system. Messages are addressed to users of the instant messaging system using their screen names. The buddy list for a user of the instant messaging system is a list of screen names for people with which the user communicates. The buddy list interface 500 enables the user to expressly designate communication identifiers as known by adding them to his or her buddy list. These identifiers are then added to the list of known people.

The buddy list interface 500 contains a text box 502 that contains the buddy list for a screen name "InternetAnn". The buddy list includes multiple screen names. The buddy list in buddy list interface 500 contains the screen name 504a, "randomcontact2," the screen name 504*b*, "Boss," the screen name 504*c*, "Mom," the screen name 504*d*, "Dad," and the screen name 504*e*, "Brother."

The buddy list may be separated into one or more buddy groups, and each buddy may belong to one of the buddy groups. When an IM client program for a person appearing in the buddy list is available to receive communications (i.e., a state commonly referred to as "present"), the screen name of the buddy in the buddy list is displayed or visually distinguished from other buddies not presently available to receive communications or otherwise not having an equivalent state. In the interface shown, present buddies have their screen names displayed under a buddy group heading for the buddy group to which they belong. The buddy group headings also contain the number of screen names from that buddy group currently logged into the instant messaging system and the total number of people in that buddy group. For example, the buddy group heading 506*a* says that one out of the ten members of the buddy group named "Buddies" is logged into the system. That one member is the user with screen name 504*a*, since that screen name 504*a* is listed under the buddy group heading 506*a*. Likewise, buddy group heading 506*b* says that one out of three members of the "Co-Workers" buddy group is logged in, and that member is the user with screen name 504*b*. Similarly, the users with the screen names 504*c*, 504*d*, and 504*e* are logged into the system and are members of the buddy group named "Family," which only has one member currently not logged in, according to buddy group heading 506*c*. The buddy list interface 500 contains a "Setup" button 508, which, when selected enables the user to add screen names to the displayed buddy list. The screen names added to a user's buddy list using the buddy list interface 500 are considered to be known to the user, and are added to the list of known people. The address book interface 400 may provide the user with an option for preventing the addition of communication identifier to the list of known people when the identifier is added to the address book. The option may prevent the addition for the identifier currently being added, or when the option is selected, may prevent all entered identifiers from being added to the list of known people.

Exemplary techniques for inferring known people from the actions of the user are described in conjunction with FIGS. 6-9. Actions of the user while reading, sending and managing e-mail can lead to the inference that the people sending and receiving that e-mail are known to the user. In addition, the contacts of those people known to the user may be inferred to be known directly by the user. Inferred people are added to the list of known people after an optional user confirmation.

Figure 6:
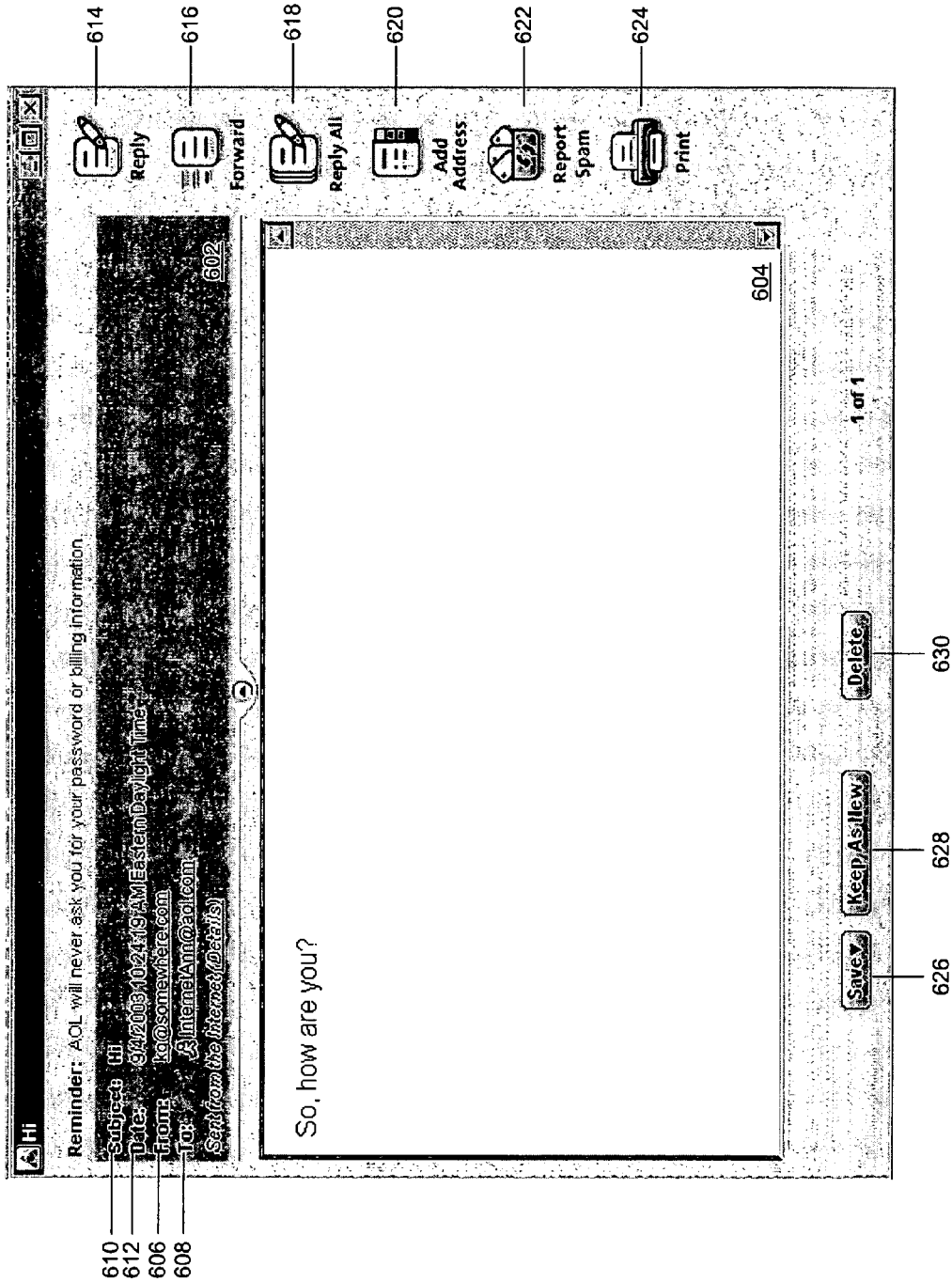
FIG. 6 is an illustration showing an interface for reading e-mail messages.

Referring to FIG. 6, use of an e-mail reading interface 600 can lead to the inference of people as known to the user. In using the e-mail reading interface 600, the user may perform certain actions while reading a message that signal that the user knows the person who sent the message. Conversely, the user may perform certain actions that signal that the user does not know the person who sent the message. If the sender of the e-mail is inferred to be known to the user based on these actions, the person who sent the e-mail is added to the list of known people.

The e-mail reading interface 600 has two major sections, 602 and 604, that show the details of the message that is currently being read. Section 602 lists the header information for the message that is currently being read. The header information includes the sender's address 606, the recipient's address 608, the subject 610 of the message, and the time 612 the message was received. The message shown was sent to InternetAnn@aol.com with a subject of "Hi" by kg@somewhere.com at 10:24 AM on Sep. 4, 2003. Section 604 contains the body of the message, which in this case is "So, how are you?"

To the right and below the contents of the displayed message are a series of buttons 614-630 that enable activity based on the displayed message. For example, a "Reply" button 614 invokes an interface for writing a reply to the sender of the displayed message. Similarly, a "Forward" button 616 invokes an interface for forwarding the displayed message. A "Reply All" button 618 has the same function as the "Reply" button 614, except that the reply message is addressed to all recipients of the displayed message.

An "Add Address" button 620 adds an entry to the address book for the sender of the displayed message. The entry includes the sender's address 606. A "Report Spam" button 622 sends a message to a service responsible for blocking spam e-mail messages. A "Print" button 624 sends the message to the printer. A "Save" button 626 expands into two options, one for saving the message on a host server, and one for saving the message locally. A "Keep As New" button 628 marks the displayed message as never having been read, and a "Delete" button 630 may immediately delete the message, or it may move the message to a temporary holding place for deleted messages.

The actions of the user while interacting with the e-mail reading interface 600 may lead to the inference that the user knows or does not know the sender of the messages that he is reading. In cases where the user is believed to know the sender of the message, the sender's e-mail address is added to the list of known people. For example, replying to the message by clicking on the "Reply" button 614 may support the inference that the sender is known. In addition, pressing the "Forward" button 616 to forward the message may support an inference that the sender, as well as all people to which the message is forwarded, are known. Similarly, pressing the "Reply All" button 618 may lead to an inference that the sender and all other recipients are known.

Pressing the "Add Address" button 620 to create an entry in the user's address book for the sender of the e-mail may lead to the inference that sender is known. On the other hand, clicking on the "Report Spam" button 622 may negate an inference that the sender is known to the user. Clicking the "Print" button 624, using the "Save" button 626, or marking the displayed message as not read with the "Keep As New" button 628 also may support an inference that the sender is known.

Leaving interface 600 open for a predetermined period of time (e.g., 30 seconds) is another action that may support an inference that the sender is know.

A number of techniques may be used to determine when a sender is inferred as known based on the above described actions. For example, a sender may be inferred as known based simply on the user performing a single one of the actions that support an inference that the sender is known. Alternatively, or additionally, combinations of actions may result in the inference that the sender is known. For example, some number of actions greater than one may be required to add the sender to the list of known people. Also, certain fixed combinations of actions may result in the addition of the sender to the list of known people. That is, certain combinations may be designated as indicating that the communication identifier is know and, when those combinations occur, the identifier is added to the list of known people. For example, replying to and saving the message may cause the sender to be added to the list of known people, but keeping the message as new and printing it may not.

As another example, each of the different possible actions may have an associated score indicative of how strongly the action suggests the identifier is known, and a certain aggregate score (a threshold score) may be required to add the sender to the list of known people. That is, the actions may be detected, an aggregate score may be determined from the associated scores, and a comparison to a threshold score may be made to infer whether the person is known to the user and, consequently, is added to the list of known people. An implementation of this technique may assign positive scores to actions supporting an inference, assign negative scores to actions negating an inference, and require a particular positive aggregate score before the identifier is inferred as known. Other methods of combining the actions of the user to infer that the sender is known to the user are possible.

When replying to a message using the "Reply All" button 618, all recipients of the message may not be known, especially when there is a large number of people to whom the original message was carbon copied. Additional actions may be required to show that the people to whom the message was carbon copied are known even though a message is sent to them, which might normally lead to the inference that the people are known. The number of people to whom the original message was carbon copied may influence the number or combinations of actions further needed to add the carbon copied recipients to the list of known people.

Figure 7:
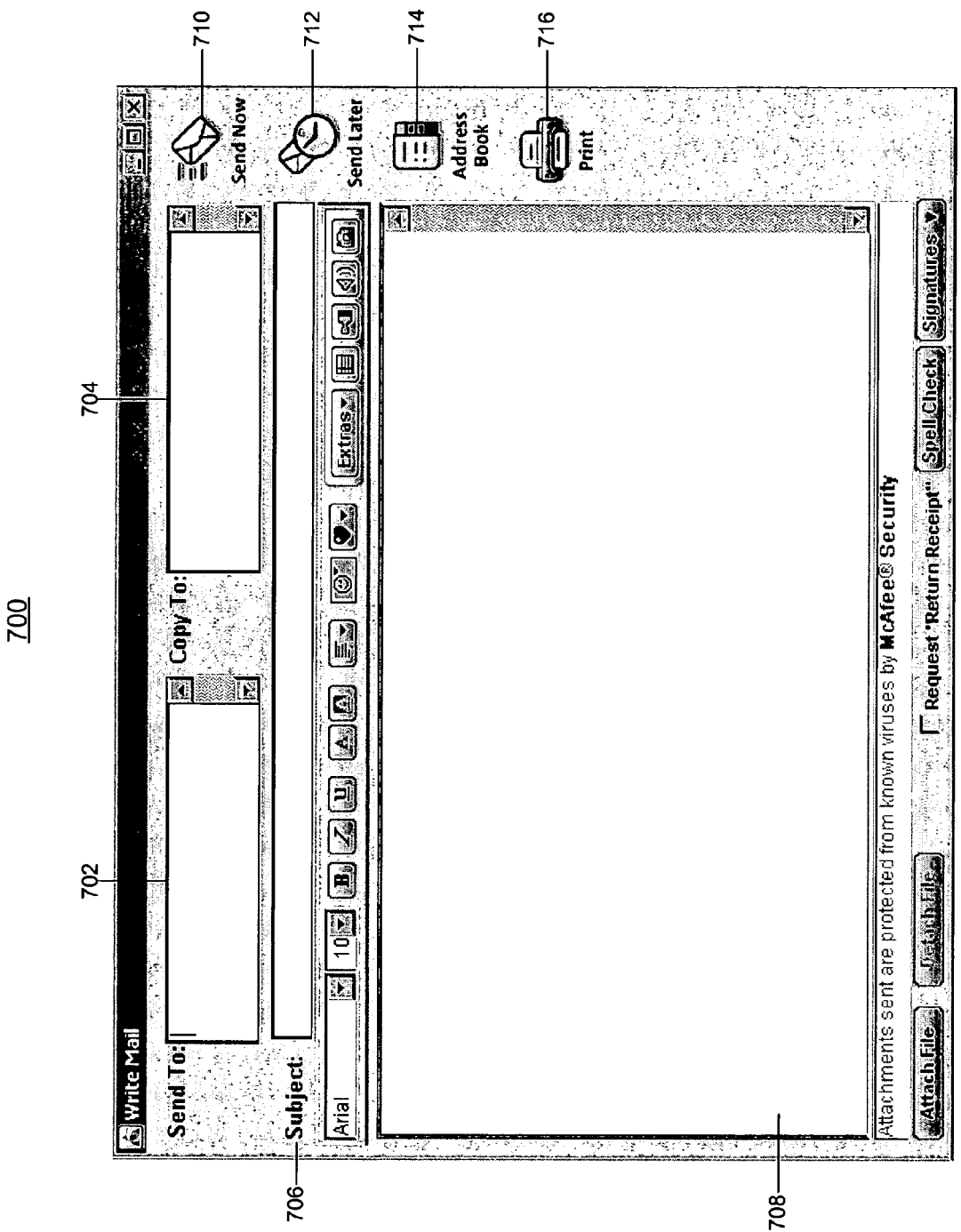
FIG. 7 is an illustration showing an interface for writing e-mail messages.

Referring to FIG. 7, use of an e-mail writing interface 700 can lead to people being added to the list of known people. In using the e-mail writing interface 700, the user may perform certain actions while writing a message that will signal that the user knows the people to whom the message will be sent. If the recipients of the e-mail are inferred to be known to the user, they are added to the list of known people.

The e-mail writing interface 700 contains multiple text fields 702-708 that can be used to specify the different parts of the message to be sent. For example, the user can specify the recipients of the message using a text field 702, labeled "Send To," and a text field 704, labeled "Copy To." The user can also specify the subject of the message in a "Subject" text field 706. Finally, the user can type the body of the message in a body text field 708.

A series of buttons 710 to 716 to the right of the text fields 702-708 govern how the message specified by the text fields 702-708 is processed. Clicking on a "Send Now" button 710 immediately processes and sends the message to the specified recipients. Clicking on a "Send Later" button 712 processes the message for sending to its intended recipients at a later time. An "Address Book" button 714 will invoke an address book interface 400. The address book interface 400 may be used to specify the recipients of the message. E-mail addresses from entries in the address book can be used to populate the text fields 702 and 704 that contain the recipients of the message. Clicking a "Print" button 716 sends the message to the printer.

The actions of the user while using the e-mail writing interface may lead to the inference that the intended recipients of the message that is being written are known to the user. The people entered in these text boxes 702 and 704 will be added to the list of known people if the user is inferred to know the people to whom the message will be sent. For example, using either the "Send Now" button or the "Send Later" button to send the message that is being written leads to the inference that the recipients of the message listed in text fields 702 and 704 are known. Likewise, printing the message with the "Print" button 716 leads to the inference that the intended recipients are known. In addition, the address book interface 400 that was invoked by the "Address Book" button 714 can be used to manually add entries to the address book, which will result in additions to the list of known people, as was described above.

If the recipients are inferred to be known, then they are added to the list of known people. Individual actions of the user while using the e-mail writing interface 700 that lead to the inference that the recipients are known may cause the recipients to be added to the list of known people, or a combination of actions may signal that the recipients should be added to the list of known people, as was described above.

The e-mail reading interface 600 and the e-mail writing interface 700 may also contain a button that enables the user to manually add the people with whom the user is communicating to the list of known people if the people are not added automatically in the manners described above. For example, clicking on the button in the e-mail reading interface 600 would cause the sender of the message to be added to the list of known people. Likewise, clicking on the button in the e-mail writing interface 700 would cause the recipient of the e-mail to be added to the list of known people.

Figure 8:
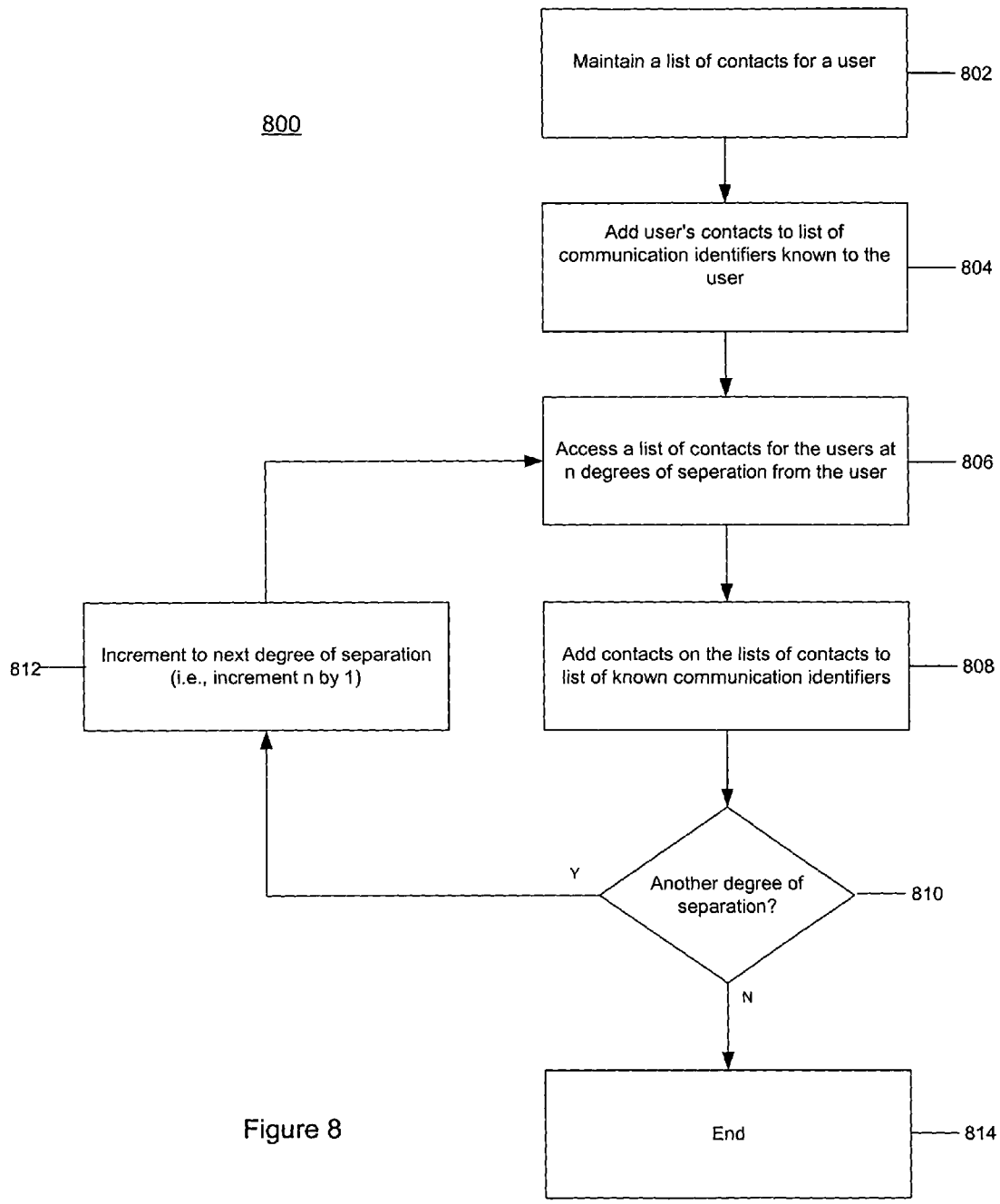
FIG. 8 is a flow chart showing a process for inferring contacts of other users as known.

Referring to FIG. 8, a process 800 may be used to infer people within a certain number of degrees of separation from the user as known to the user. The degree of separation between two entities describes a relationship between those entities. Typically, the characteristics of user contact lists (e.g., address book, buddy list, and/or white list) are evaluated to determine the number of degrees (or hops) that are required to link or relate two users.

For example, recipient A may list user B in recipient A's address book, user B may list user C in user B's address book, and user C may list sender D in user C's address book. Here, sender D is linked to recipient A by two degrees of separation (with user B as the first degree and user C as the second degree). Recipient A is related to user C by one degree of separation (user B) and user B is separated from sender D by one degree of separation (user C). Recipient A and user B, users B and C, and user C and sender D are each respectively separated by zero degrees of separation.

A list of contacts is maintained for the user (802). The list of contacts may be any personally maintained list or lists, for example, an address book, a buddy list for instant messaging, and/or a white list. The rest of process 800 will be described using an address book as an example of a list of contacts. The contacts in the user's address book are added to the user's list of known people (804).

Next, the contacts linked to the user (i.e., up to a desired degree of separation) are identified and added to the user's list of known people. To do so, the address books of each contact in the user's address book are accessed (806). These address books are not normally configured for direct access by the user. That is, the user does not normally have access to other user's address books such as the address books of the contacts in the user's address book (the user's address book is configured for direct access by the user). The other users' address books typically include communication identifiers selected by the other users.

The contacts in the user's contacts' address books (i.e., the contacts separated by one degree) then are added to the list of known people (808). If another degree of separation is desired (810), the degree of separation is incremented (812) such that the address books of the contacts that are separated from the user by one degree are accessed (806) and the contacts in those address books are added to the list of known people list (808). When a contact is added to the list of known people list, the contact's degree of separation from the user also may be added. The addition of contacts continues until the desired degree of separation is reached (810). Once the desired degree of separation has been reached, all of the contacts within that desired degree of separation from the user have been inferred as known to the user (814).

The desired degrees of separation may be a system parameter or, in some implementations, the user may be provided the user with the ability to set the desired degrees of separation. For example, the user may be provided with an interface that allows the user to decide whether degrees of separation will be used, and, if so, how many degrees should be used. Alternatively, the desired degrees of separation may be both a system parameter and able to be set by the user. For example, the system may include a default degrees of separation, which can be adjusted by the user if he or she so desires.

Process 800 may result in the list of known people not being updated when any users related to the intended user update their contact lists. That is, if a user related to the intended user adds a contact to the user's contact list, the new contact may not be reflected in the intended user's list of known people. This situation may not be overly detrimental, particularly in implementations where the list of known people is used as a white list to exempt certain e-mails from spam filtering. However, repeating process 800 on a periodic or a periodic basis may mitigate this situation. Another manner of mitigating this situation is to use an update system in which changes to contact lists are tracked and lists of known people are updated accordingly in an incremental fashion or by triggering an update or re-initiation of process 800 when an update occurs.

Figure 9:
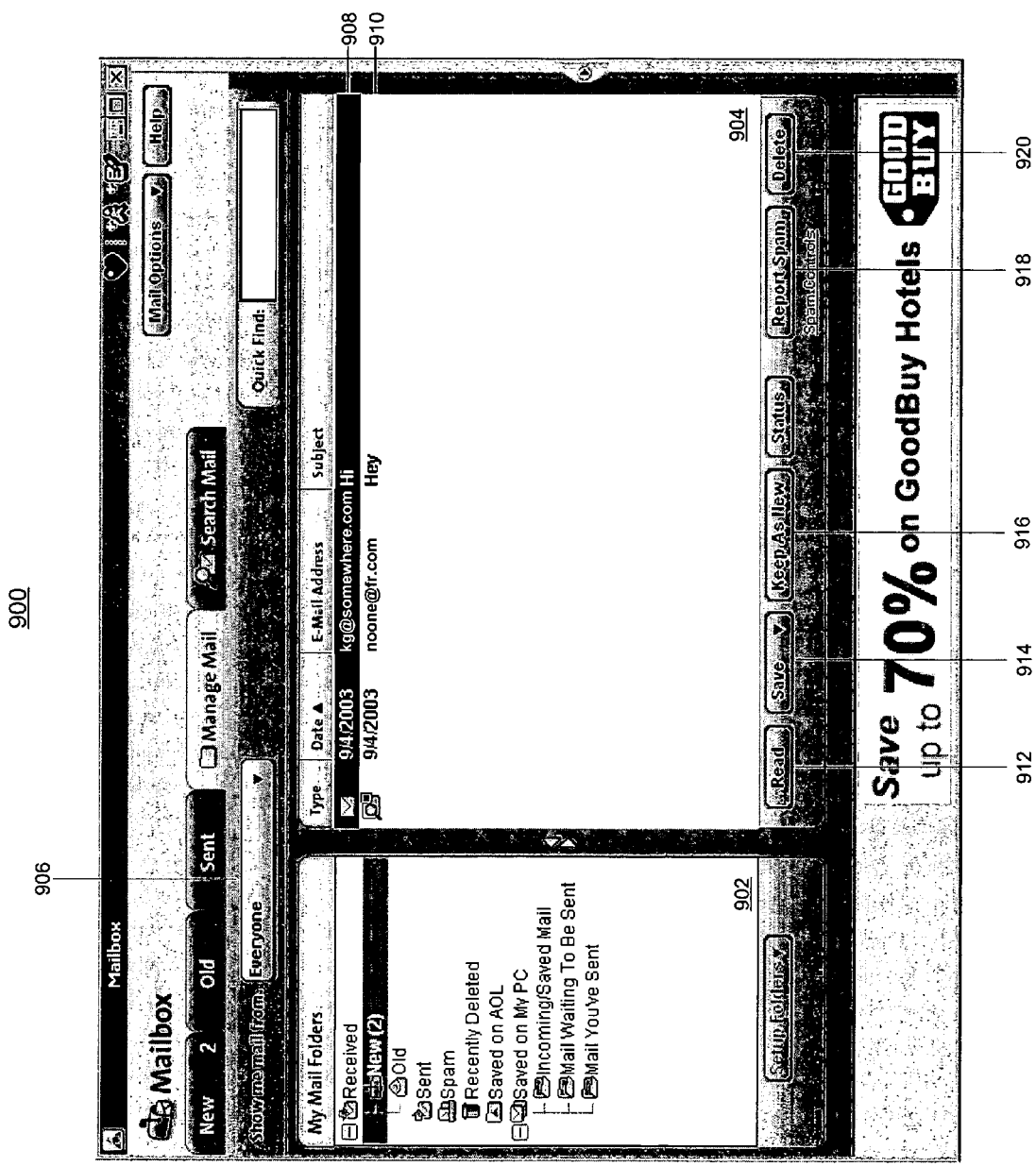
FIGS. 9, 10, and 11 are illustrations showing an interface for managing e-mail messages.

Referring to FIG. 9, using an e-mail managing interface 900 may result in additions to the list of known people. The actions of the user while interacting with the e-mail managing interface 900 may lead to the inference that certain people are known to the user. Conversely, the user may perform certain actions that signal that the user does not know certain people. If people are inferred as known to the user from these actions, the people are added to the list of known people.

Two main components of the e-mail managing interface 900 are the folder list 902 and the message list 904. The folder list 902 contains the different folders into which messages can be filed. When a folder is selected from the folder list 902, its contents are listed in the message list 904. In this case, the folder called "New" has been selected from the folder list 902, and its contents are listed in the message list 904. Drop down selection box 906 allows for the filtering of the messages shown in the message list 904 based on their sender. In this case, "Everyone" is chosen in the selection box 906, so all messages in the "New" folder are shown in the message list 904. These include a message 908 from kg@somewhere.com, and a message 910 from noone@fr.com, both sent on Sep. 4, 2003. Clicking and dragging a message from the message list 904 to the folder list 902 with the mouse files that message in the folder whose name is under the current position of the mouse, thus removing the message from the folder selected in the folder list 902.

A series of buttons below the message list 904 allow the user to work with the messages in the message list 904. For example, a "Read" button 912 will create an e-mail reading interface 600 for the message selected in the message list 904. Clicking on a "Save" button 914 will save the message selected in the message list 904, either to the hard drive of the local machine or to a remote server. A "Keep As New" button 916 will mark the selected message as never having been read. Clicking on a "Report Spam" button 918 will send a message to a service responsible for blocking spam messages with regards to the message selected in the message list 904. A "Delete" button 920 either immediately deletes the selected message or temporarily moves the selected message to a holding place for deleted messages.

The user's actions while using folders, messages, and buttons present in the e-mail managing interface 900 may result in the addition of people to the list of known people. Moving a message between the different folders of the folder list 902 may lead to the inference that the sender or recipients of the message are known. For example, dragging message 908 from the "New" folder to another folder, except for a spam or delete folder, may result in the inference that the sender of message is known to the user. Opening a message with the "Read" button 912 may support an inference that the sender of the message is known. Pressing the "Save" button 914 or the "Keep As New" button 916 also may result in the inference that the sender of the message is known to the user. On the other hand, use of the "Report Spam" button 918 and the "Delete" button 920 may negate an inference that the senders or recipients are known to the user. Similar to what was described above with respect to FIG. 6, individual actions or a combination of actions when using the e-mail managing interface 900 may lead to the inference that people are known to the user. Those people that are inferred to be known to the user are added to the list of known people after an optional confirmation by the user.

Figure 10:
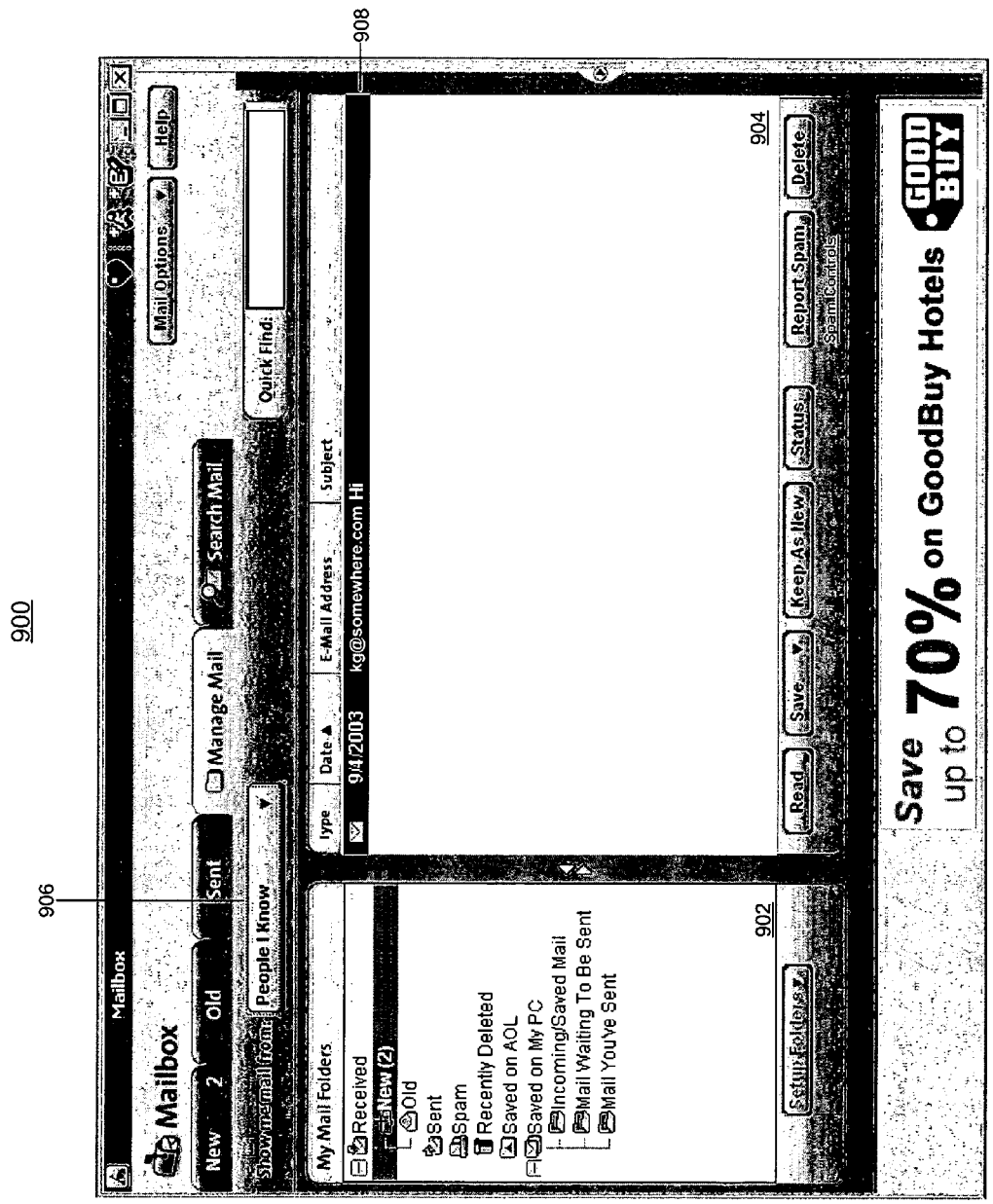
Figure 11:
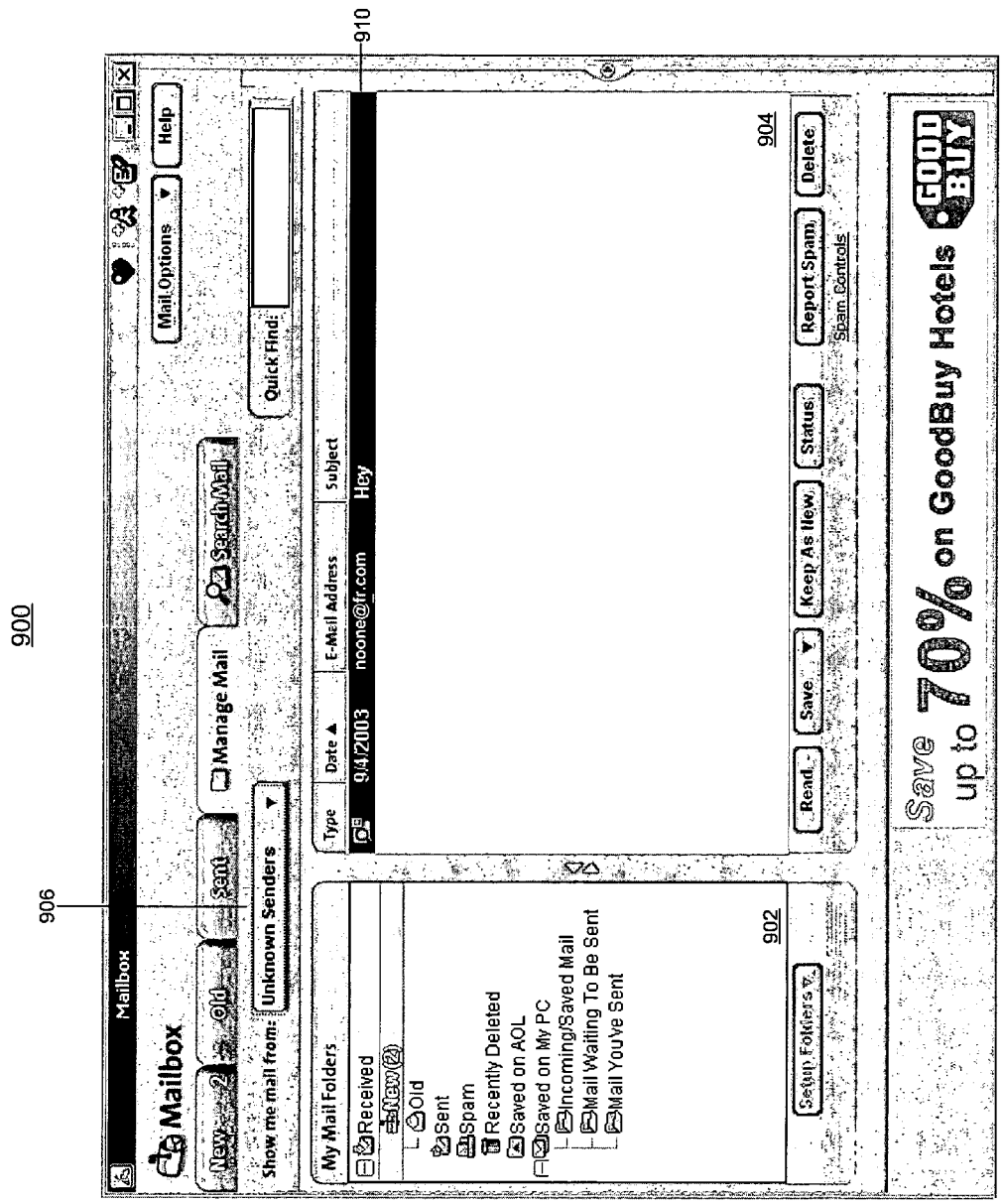
Figure 12:
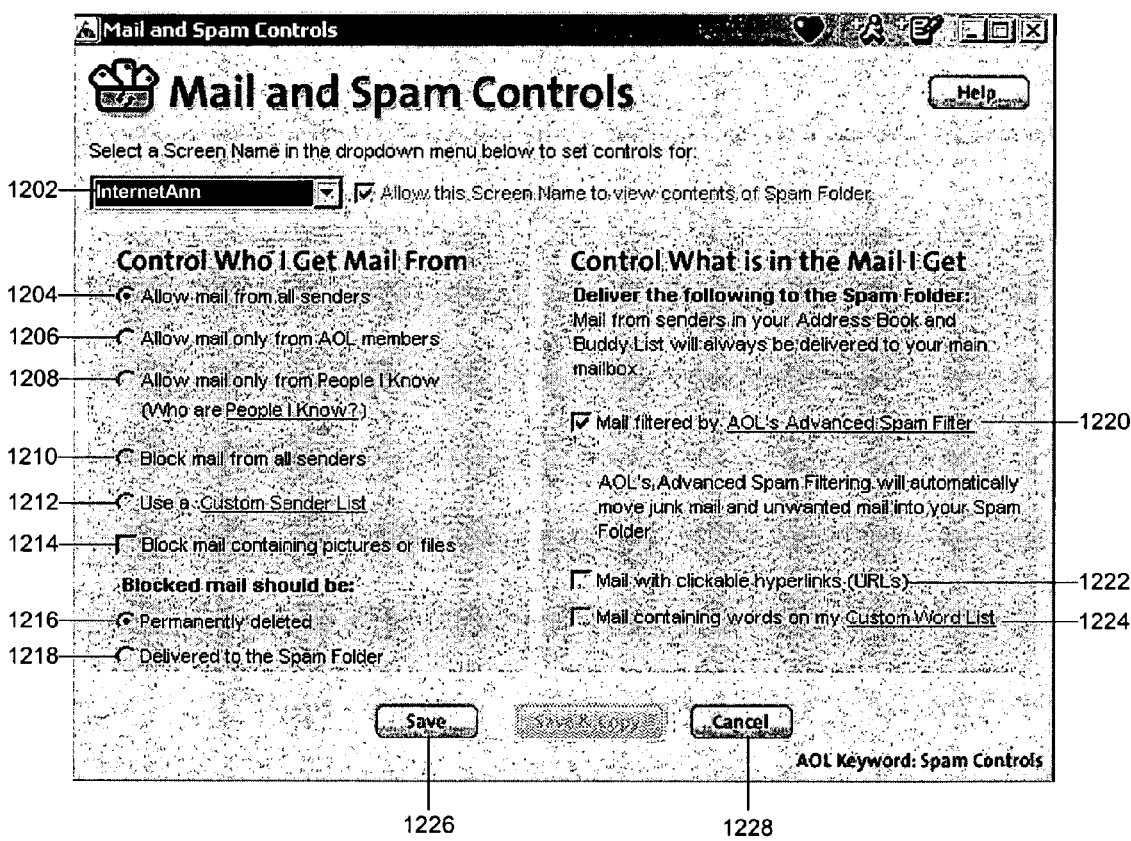
FIG. 12 is an illustration showing an interface for setting and modifying mail and spam controls.

FIGS. 10-12 illustrate exemplary uses of the list of known people in controlling aspects of the user's communication. The list of known people can be used to control aspects of the user's communication using, for example, an e-mail or instant messaging client.

Referring to FIG. 10, the list of known people can be used to control the e-mail messages displayed on an e-mail managing interface 900. The e-mail managing interface contains a folder list 902 into which messages can be filed. When a folder is selected from the folder list 902, its contents are listed in the message list 904. In this case, the folder called "New" has been selected from the folder list 902, and its contents are listed in the message list 904.

Drop down selection box 906 allows for the filtering of the messages shown in the message list 904 based on their sender. In this case, the option "People I Know" has been selected from the selection box 906. This causes the displayed messages to be filtered against the list of known people for the user. Messages from people that are in the list of known people are displayed in the message list 904, while messages from senders that are not in the list of known people do not appear in the message list 904.

For example, the message list 904 from FIG. 9, which also displayed the messages in the "New" folder, had two messages: message 908 from kg@somewhere.com and message 910 from noone@fr.com. The e-mail address kg@somewhere.com is in the list of known people for the user, while noone@fr.com is not. When "People I Know" is selected from the selection box 906, message 910 is filtered out from the set of messages shown to the user in the message list 904. The only message that is displayed is message 908 from kg@somewhere.com. Therefore, the list of known senders was used to limit the e-mail messages shown to the user to only those coming from people on the list.

Referring to FIG. 11, the list of known people can be used to control the e-mail messages displayed on an e-mail managing interface 900 in the opposite manner as was done with respect to FIG. 10. The e-mail managing interface contains a folder list 902 into which messages can be filed. When a folder is selected from the folder list 902, its contents are listed in the message list 904. In this case, the folder called "New" has been selected from the folder list 902, and its contents are listed in the message list 904.

Drop down selection box 906 allows for the filtering of the messages shown in the message list 904 based on their sender. In this case, the option "Unknown Senders" has been selected from the selection box 906. This causes the displayed messages to be filtered against the list of known people for the user in the opposite manner as was done with respect to FIG. 10. In other words, messages from people that are not in the list of known people are displayed in the message list 904, while messages from senders that are in the list of known people do not appear in the message list 904.

For example, the message list 904 from FIG. 9, which also showed the messages in the "New" folder, had two messages: message 908 from kg@somewhere.com and message 910 from noone@fr.com. The e-mail address kg@somewhere.com is in the list of known people, while noone@fr.com is not. When "Unknown Senders" is selected from the selection box 906, message 908 is filtered out from the set of messages shown to the user in the message list 904. The only message that is displayed is message 910 from noone@fr.com. Therefore, the list of known senders is used to limit the e-mail messages shown to the user to only those coming from people not on the list.

Referring to FIG. 12, an e-mail control interface 1200 enables further control over a user's e-mail messages based on the list of known people. The e-mail control interface 1200 contains a user selection box 1202. The user to which the controls specified in the e-mail control interface 1200 will apply is selected with user selection box 1202. A series of options 1204-1224 provide for different manners of filtering received e-mail.

Options 1204-1212 allow the user to define the senders from whom the selected user will receive e-mail. Option 1204 enables the user to receive e-mail from all senders. Selecting option 1204 will cause the selected user to receive e-mail from anyone, regardless of whether they appear on the list of known people. Option 1206 enables the user to receive e-mail only from America Online (AOL) members. Selecting option 1206 will cause the selected user to receive e-mail messages only from customers of the America Online internet service provider, while all other messages are blocked. Option 1208 enables the user to receive e-mail only from known people. Selecting option 1208 causes the selected user's e-mail to be filtered against the list of known people. Messages from people appearing on the list are accepted, while all other messages are blocked.

Option 1210 enables the user to block e-mail from all senders. Selecting this option 1210 will cause all of the e-mail messages addressed to the selected user to be blocked. Option 1212 enables the user to use a custom sender list to determine what mail is received. The custom sender list contains a white list and a black list. Messages from those people appearing on the white list are shown to the user, while messages from people appearing on the black list are blocked from the user. Options 1204-1212 may be mutually exclusive.

Option 1214 enables blocking any e-mail messages containing pictures or files. Selection of option 1214 causes all messages containing pictures or files to be blocked. Options 1216 and 1218 allow the user to define what happens to blocked messages. Option 1216 enables permanently deleting blocked messages. Selecting option 1216 causes all blocked messages to be deleted immediately, leaving no opportunity for the user to view them. Option 1218 enables delivery of blocked messages to a folder designated for spam. Selecting option 1218 causes blocked messages to be placed in the folder designated for spam. The user has the option of viewing these messages after they have been placed in the spam folder. A third option (not shown) may cause the blocked messages to be maintained in a temporary holding folder. The messages stored in the temporary holding folder may be deleted after a certain amount of time that may be selected by the user. Options 1216, 1218, and the third option are mutually exclusive.

Options 1220-1224 control what mail is received by the user selected in the selection box 1202. Option 1220 enables filtering of the incoming e-mail messages with a spam filter. Selecting this option 1220 will cause a user's e-mail messages to be filtered based on whether or not the messages are spam messages or not. The list of known people may be used by the spam filter when determining if a message is a spam message. For example, the spam filter could use the list of known people as a white list when determining which messages to keep. Messages from people on the white list may be accepted, while messages from people that are not on the list are rejected. Alternatively, the white list may be used to exempt communications from people on the white list from spam filtering, while communications from people not on the white list are subjected to spam filtering. As another example, the spam filter could use the list of known people to assign a spam score to incoming messages. Messages from people that are not on the list of known people may receive a higher spam score than those messages from people on the list. Those messages that are determined to be spam are delivered to the user's spam mailbox, and those messages that are not spam are delivered to the user's main mailbox.

Option 1222 enables filtering the incoming e-mail messages based on whether they contain one or more clickable hyperlinks or uniform resource locators (URLs). If this option 1222 is selected, messages with clickable URLs are delivered to the user's spam folder, and those messages that do not are delivered to the user's main mailbox. A second option (not shown) for handling messages with clickable URLs enables delivering messages with URLs directed to inappropriate or parentally controlled content to the user's spam folder and delivering all other messages to the user's main mailbox. Option 1224 enables filtering of the user's incoming e-mail messages based on whether they contain any of the words contained in a custom word list. If this option 1224 is selected, messages that contain words from the custom word list are delivered to the user's spam folder, and those messages that do not are delivered to the user's main mailbox.

The list of known people may be used in conjunction with the filtering performed by options 1222 and 1224 by exempting messages from known people from these controls. In other words, messages meeting the criteria indicated by options 1222 and 1224, when selected, may be sent to a spam folder, except for when the sender of the message is on the known list. For example, a message with a URL may be received. Normally, when option 1222 is selected, the message with the URL is place in a spam folder. When the message with the URL is from a known person, however, the message is not sent to the spam folder, but rather is delivered as normal.

A save button 1226 and a cancel button 1228 are also present on the e-mail control interface 1200. The save button 1226 saves any changes made to the options 1204-1224 for the user selected in the selection box 1202, while the cancel button 1228 discards any changes that have been made and restores the options to their previous settings.

In addition to the uses of the list of known people discussed with respect to FIGS. 10-12, there are other uses related to a user's communications with an instant messaging client. For example, the IM screen names of known people may be used to restrict instant messages or chat requests to only those people who the user knows. The IM screen names of known people also may be used to restrict who can view presence information of the user to those people the user knows. That is, other users may be restricted from viewing whether the user is online (i.e., logged into the IM system) unless the other users are people the user knows. Referring again to FIG. 5, presence information for "randomcontact2" is shown because "InternetAnn" is on the list of known people for "randomcontact2." Other people that do not have "InternetAnn" on their list of known people do not appear in the buddy list interface 500 because "InternetAnn" is restricted from viewing their presence information.

Figure 14:
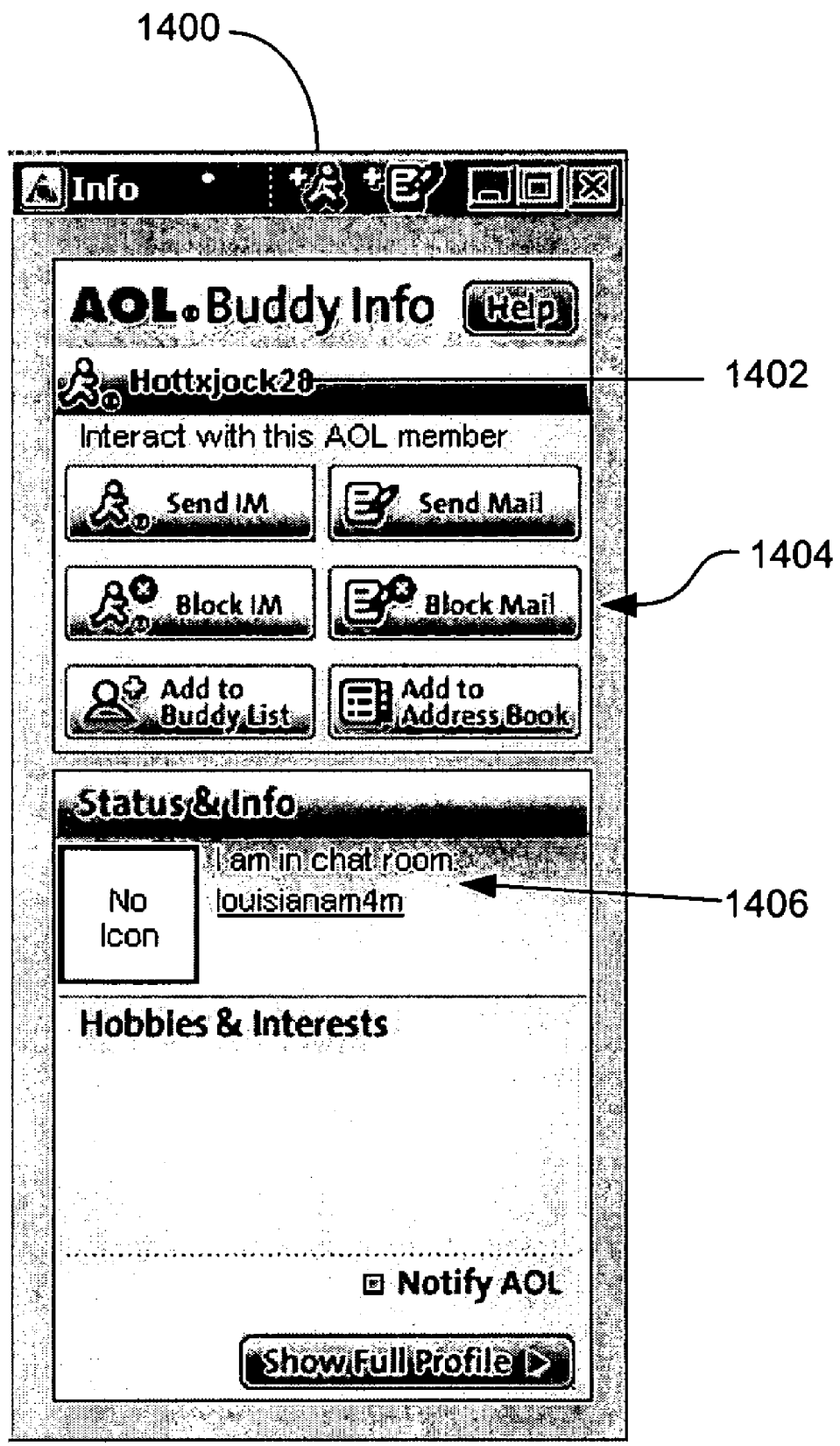
Figure 15:
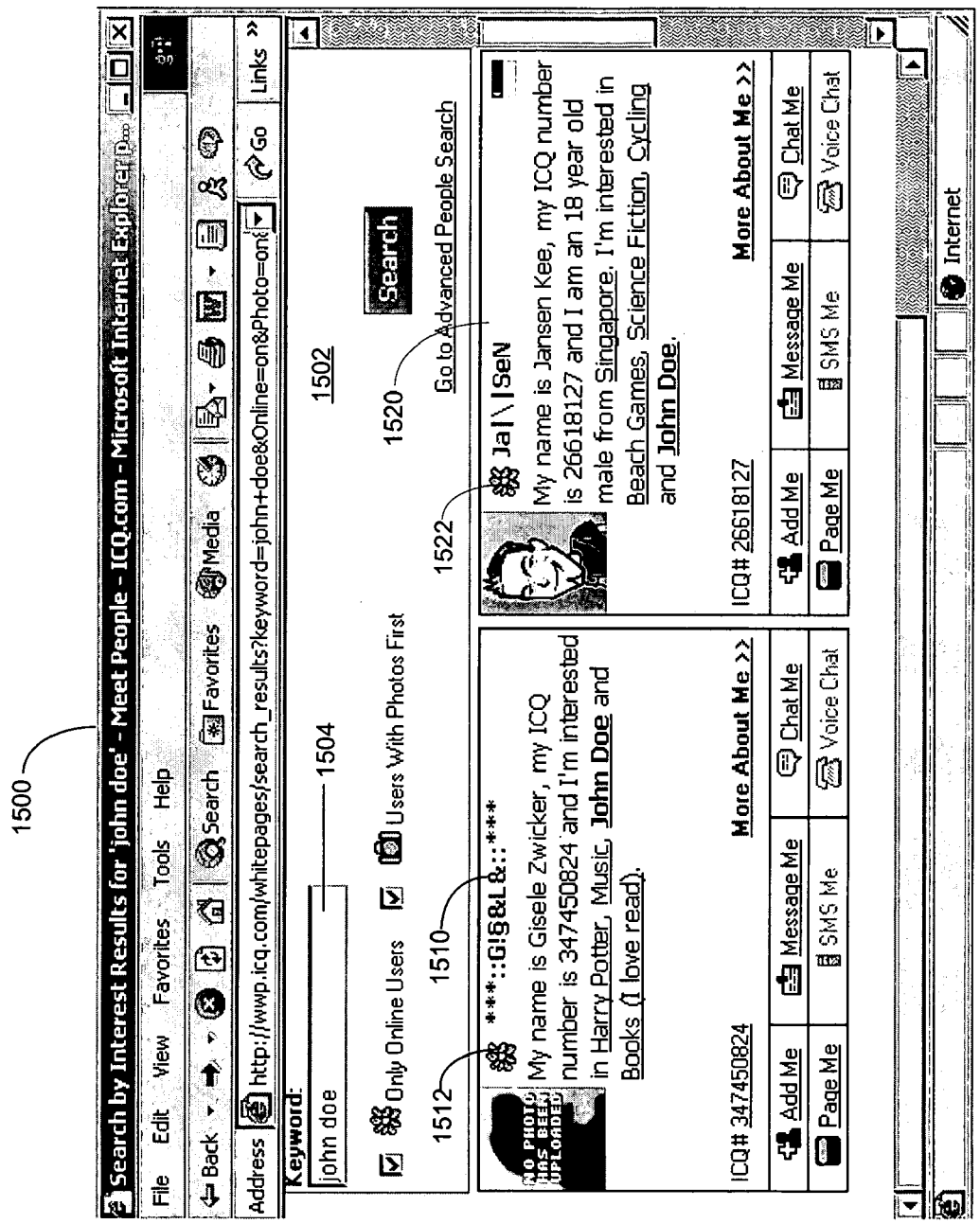

The list of known people also may be used to restrict displays of online presence information more generally. FIGS. 13, 14 and 15 show additional environments in which online presence information can be restricted using the list of known people.

Referring to FIG. 13, some services, such as America Online, allow users to search for other members. The list of members matching the users search criteria includes indications as to whether a member is online. As shown, an interface 1300 includes a window 1310 that displays search results for a person's search criteria (e.g., members who have John Doe somewhere in their profile). The search results include a list of members matching the search criteria. The results include the screen name, the member name, and the location of each member matching the criteria. An icon 1314 provides online presence information. Icon 1314 is displayed in window 1310 next to members who are currently online.

Referring to FIG. 14, some services such as America Online display online presence information in a user's member profile. A user's member profile may be displayed as the result of selecting a member from search results such as those shown in FIG. 13, or, for example, the member profile may be invoked by a user when the user comes across a screen name while using a communication service such chat or message boards. Other manners manner of invoking the member profile may be available depending on the service.

When a user invokes another user's member profile, an interface 1400 is provided. The interface includes the screen name 1402 of the user whose profile is being shown. Interface 1400 also includes a number of buttons 1404 that allow the invoking user to interact with the user whose profile is being shown. Interface 1400 also has an area 1406 that provides online presence information. In the exemplary profile illustrated, the member is currently online an in the chat room "louisianam4m." Area 1406 indicates that the member is not online when the member is not online.

Referring to FIG. 15, some instant messaging and other online services provide web pages that display online presence information. As shown, a web browser 1500 displays a search page 1502 for ICQ in which a person can search profiles of ICQ users. Profiles 1510 and 1520 are shown as a result of a search using the criteria "John Doe" anywhere in the profile. Icons 1512 and 1522, which are part of profiles 1510 and 1520 respectively, provide online presence information. Icons 1512 and 1522 are shown in one color when the user is online and in a different color when the user is not online.

In any of these environments, the online presence information may be restricted based on the list of known people. The online presence information may be restricted such that only some or all of the people known to a user may view the user's online presence information. For instance, icon 1314 may be absent when the person viewing the search results is not a person known to the user whose screen name is "Hotxjock28." Likewise, area 1406 may not provide any online presence information when the person viewing the profile is not known to the user whose screen name is "Hotxjock28." Lastly, icon 1512 or 1522 may indicate the user is not online, or indicate that the online presence information is unavailable, when the person viewing the profile 1510 or 1520 is not known to the user whose profile information is shown.

Further, the online presence information may be restricted or not provided to a potential receiver of the online presence information when the potential receiver requests the online presence information through an application such as an instant messaging application, or by virtue of displaying a web page, member profile, or member search result. In some environments that provide online presence information, the information may be provided in response to a request to receive the online presence information. In such environments, when the request is received, a determination as to whether the online presence information is communicated may be based on whether the potential receiver is included in the list of known people. The online presence information may be restricted or not provided to the potential receiver when the potential receiver is not included in the list.

In other implementations, the online presence information may be restricted or not provided to a potential receiver of the online presence information absent a request for the online presence information. In some environments, online presence information may be broadcast generally to users. Certain users may be excluded from the broadcast of online presence information when those users are not on the list of people known to the user.

Another use of the list of known people may include filtering out communications with questionable content sent to teens or younger individuals when the communication is from someone unknown to the teen or younger individual. Many times, inappropriate (e.g., pornographic) communications such as e-mail is sent to teens or younger individuals. There may be certain indicia that a communication is inappropriate, or that it may lead to inappropriate content. One such indicia, for instance, is the presence of a Uniform Resource Locator (URL) located in the body of an e-mail. Other indicia may include certain words or phrases, such as vulgar or lewd words, included in the communication. Such indicia may be a stronger indicator that the communication is inappropriate when the e-mail is from someone unknown to the teen or young adult.

Some Internet Service Providers (ISPs), e.g. America Online, Inc. (AOL), allow a master account owner to designate associated accounts as teen or child accounts. Indicia of inappropriate communications, along with the list of known people, can be used to filter out potentially inappropriate content sent to a teen or child account.

Figure 16:
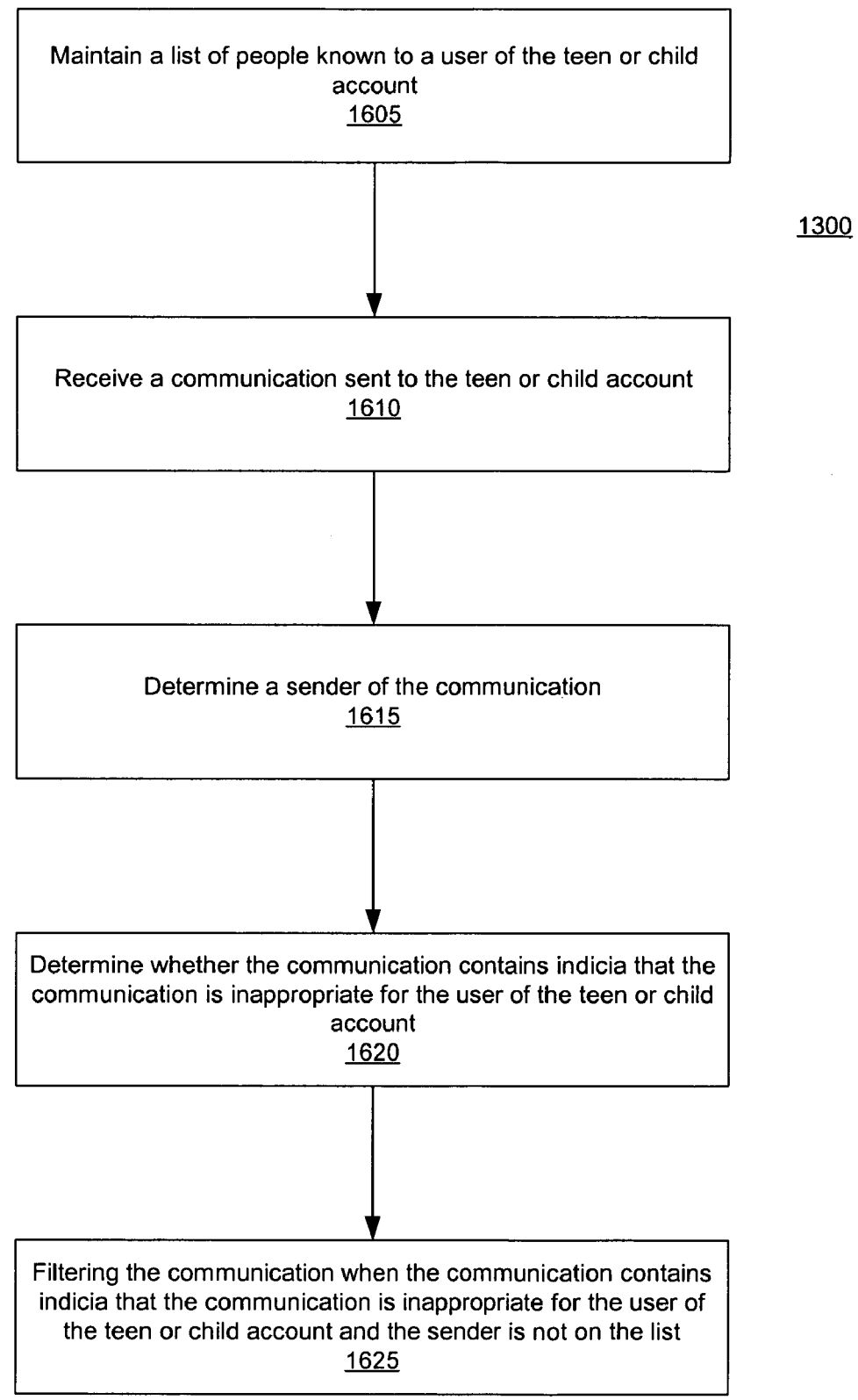
FIG. 16 is a flow chart showing a process for filtering communications sent to a teen or child account.

FIG. 16 is a flow chart showing a process 1600 for filtering communications sent to a teen or child account. A list of people known to the user of the teen or child account is maintained for example, using the techniques described above (1605). When a communication sent to the teen or child account is received (1610), the sender of the communication is determined (1615). The communication may include, for example, an e-mail or an instant message.

A determination also is made as to whether the communication contains indicia that the communication is inappropriate for the user of the teen or child account (1620). As described above, such indicia may include a URL located in the body of the communication and/or certain words being included in the body of the communication.

When the communication contains such indicia and the sender is not on the list of known people, the communication is filtered (1625). Filtering may include blocking or deleting the communication. Alternatively, or additionally, filtering may include placing the communication in a secured place that the master account owner can access, but the teen or child user can not. For example, the communications may be placed in a secure spam folder. The spam folder may be secured, for example, by preventing the teen or child account user from seeing the folder or by password protecting the folder.

Thus, for example, emails that contain URLs or certain words or phrases and that are sent to a teen or child account by someone not known to the teen or child (i.e., someone not on the list of known people) may be automatically deleted or blocked. Alternatively, such e-mails may be sent to a spam folder. When the spam folder is designed to be locked from teens or younger adults (e.g., by preventing them from seeing the folder or requiring a password to access the folder), this can potentially prevent them from being exposed to inappropriate content.

The techniques described above are not limited to any particular hardware or software configuration. Rather, they may be implemented using hardware, software, or a combination of both. The methods and processes described may be implemented as computer programs that are executed on programmable computers comprising at least one processor and at least one data storage system. The programs may be implemented in a high-level programming language and may also be implemented in assembly or other lower level languages, if desired.

Any such program will typically be stored on a computer-usable storage medium or device (e.g., CD-Rom, RAM, or magnetic disk). When read into the processor of the computer and executed, the instructions of the program cause the programmable computer to carry out the various operations described above.

A number of implementations have been described. Nevertheless, it will be understood that various modifications may be made. Accordingly, implementations other than those specifically described are within the scope of the following claims.

What is claimed is:

1. A method of providing online presence information:
   maintaining, on one or more computers, a list of people that is known to a user;
   determining, at the one or more computers, that a person is known to the user based, at least in part, on one or more actions performed by the user on one or more messages received by the user from the person, the actions including one or more of (1) saving the one or more messages from the person; (2) printing the one or more messages from the person; (3) moving the one or more messages from the person from an inbox to a folder; and (4) leaving the one or more messages from the person open for a predetermined period of time;
   in response to determining that the person is known to the user, adding the person to the maintained list;
   accessing, at the one or more computers, the maintained list of people determined to be known to a user;
   accessing, at the one or more computers, online presence information for the user;
   determining, at the one or more computers, a potential receiver of the online presence information;
   comparing, at the one or more computers, the potential receiver to the accessed list to determine if the potential receiver is included on the list; and
   determining, at the one or more computers, whether to communicate the online presence information to the potential receiver based on whether the potential receiver is included in the list.

2. The method of claim 1 wherein determining whether to communicate the online presence information to the potential receiver comprises determining to not communicate the online presence information to the potential receiver when the potential receiver is not included in the list.

3. The method of claim 1 wherein determining whether to communicate the online presence information to the potential receiver comprises determining whether to communicate the online presence information to an instant messaging application of the potential receiver.

4. The method of claim 1 wherein determining whether to communicate the online presence information to the potential receiver comprises determining whether to display the online presence information on a web page.

5. The method of claim 1 wherein determining whether to communicate the online presence information to the potential receiver comprises determining whether to display the online presence information in member search results.

6. The method of claim 1 wherein determining whether to communicate the online presence information to the potential receiver comprises determining whether to display the online presence information in a member profile.

7. The method of claim 1 wherein determining whether to communicate the online presence information to the potential receiver comprises determining whether to communicate the online presence information to the potential receiver when a request for online presence information is received from the potential receiver.

8. The method of claim 1 wherein determining whether to communicate the online presence information to the potential receiver comprises determining whether to communicate the online presence information to the potential receiver absent a request from the potential receiver for the online presence information.

9. The method of claim 1 wherein the actions performed by the user on one or more messages received by the user from the person include saving an e-mail received from the person.

10. The method of claim 1 wherein the actions performed by the user on one or more messages received by the user from the person include printing an e-mail received from the person.

11. The method of claim 1 wherein the actions performed by the user on one or more messages received by the user from the person include moving an e-mail from a first folder to a second folder.

12. The method of claim 11 wherein the folder is a folder other than a delete folder or a spam folder.

13. The method of claim 1 wherein the actions performed by the user on one or more messages received by the user from the person includes leaving an e-mail from the person open for a predetermined period of time.

14. The method of claim 1 wherein determining that a person is known to the user based, at least in part, on one or more actions performed by the user on one or more messages received by the user from the person further comprises inferring that a person is known to the user, wherein inferring comprises:
   accessing a contact list of the user to determine a first contact on the user's contact list; and
   accessing a contact list of the first contact to determine a second contact on the first contact's contact list.

15. The method of claim 1 wherein determining that a person is known to the user based, at least in part, on one or more actions performed by the user on one or more messages received by the user from the person includes detecting user actions that mitigate against factors that otherwise are used to determine a person is known to the user.

16. The method of claim 15 wherein the user actions comprise the user taking steps to label a communication from the person as spam.

17. The method of claim 15 wherein the user actions comprise the user taking steps to add a person to a blacklist.

18. The method of claim 15 wherein the user actions comprise the user taking steps to move a communication from the person to either of a spam folder or a delete folder.

19. The method of claim 1 further comprising:
enabling the user to expressly designate a person as known to the user; and
adding the designated person to the list.

20. A computer-usable medium having a computer program embodied thereon for providing online presence information, the computer program comprising instructions for causing a computer to perform the following operations:
maintain a list of people that is known to a user;
determine that a person is known to the user based, at least in part, on one or more actions performed by the user on one or more messages received by the user from the person, the actions including one or more of (1) saving the one or more messages from the person; (2) printing the one or more messages from the person; (3) moving the one or more messages from the person from an inbox to a folder; and (4) leaving the one or more messages from the person open for a predetermined period of time;
in response to determining that the person is known to the user, add the person to the maintained list;
access the maintained list of people determined to be known to a user;
access online presence information for the user;
determine a potential receiver of the online presence information;
compare the potential receiver to the accessed list to determine if the potential receiver is included on the list; and
determine whether to communicate the online presence information to the potential receiver based on whether the potential receiver is included in the list.

21. The medium of claim 20 wherein, to determine whether to communicate the online presence information to the potential receiver, the computer program further comprises instructions for causing the computer to determine to not communicate the online presence information to the potential receiver when the potential receiver is not included in the list.

22. The medium of claim 20 wherein, to determine whether to communicate the online presence information to the potential receiver, the computer program further comprises instructions for causing the computer to determine whether to communicate the online presence information to an instant messaging application of the potential receiver.

23. The medium of claim 20 wherein, to determine whether to communicate the online presence information to the potential receiver, the computer program further comprises instructions for causing the computer to determine whether to display the online presence information on a web page.

24. The medium of claim 20 wherein, to determine whether to communicate the online presence information to the potential receiver, the computer program further comprises instructions for causing the computer to determine whether to display the online presence information in member search results.

25. The medium of claim 20 wherein, to determine whether to communicate the online presence information to the potential receiver, the computer program further comprises instructions for causing the computer to determine whether to display the online presence information in a member profile.

26. The medium of claim 20 wherein, to determine whether to communicate the online presence information to the potential receiver, the computer program further comprises instructions for causing the computer to determine whether to communicate the online presence information to the potential receiver when a request for online presence information is received from the potential receiver.

27. The medium of claim 20 wherein, to determine whether to communicate the online presence information to the potential receiver, the computer program further comprises instructions for causing the computer to determine whether to communicate the online presence information to the potential receiver absent a request from the potential receiver for the online presence information.

28. The medium of claim 20 wherein the folder is a folder other than a delete folder or a spam folder.

29. The medium of claim 20 wherein the computer program further comprises instructions for causing the computer to determine that a person is known to the user further comprises instructions for causing the computer to:
access a contact list of the user to determine a first contact on the user's contact list; and
access a contact list of the first contact to determine a second contact on the first contact's contact list.

30. The medium of claim 20 wherein the computer program further comprises instructions for causing the computer to determine that a person is known to the user based, at least in part, on detecting user actions that mitigate against factors that otherwise are used to determine a person is known to the user.

31. The medium of claim 30 wherein the user actions comprise the user taking steps to report a communication from the person as spam.

32. The medium of claim 30 wherein the user actions comprise the user taking steps to add a person to a blacklist.

33. The medium of claim 30 wherein the user actions comprise the user taking steps to move a communication from the person to either of a spam folder or a delete folder.

34. The medium of claim 20 wherein the computer program further comprises instructions for causing the computer to:
enable the user to expressly designate a person as known to the user; and
add the designated person to the list.

35. An apparatus for providing online presence information:
means for maintaining a list of people that is known to a user;
means for determining that a person is known to the user based, at least in part, on one or more actions performed by the user on one or more messages received by the user from the person, the actions including one or more of (1) saving the one or more messages from the person; (2) printing the one or more messages from the person; (3) moving the one or more messages from the person from an inbox to a folder; and (4) leaving the one or more messages from the person open for a predetermined period of time;
means for in response to determining that the person is known to the user, adding the person to the maintained list;
means for accessing the maintained list of people known to a user;
means for accessing online presence information for the user;
means for determining a potential receiver of the online presence information;

means for comparing the potential receiver to the maintained list to determine if the potential receiver is included on the list; and means for determining whether to communicate the online presence information to the potential receiver based on whether the potential receiver is included in the list.

36. The method of claim 1 further comprising:

determining that a person is known to the user by accessing a contact list of the user.

37. The medium of claim 20 wherein the computer program further comprises instructions for causing the computer to:

determine that a person is known to the user by accessing a contact list of the user.

38. A method of providing online presence information, the method comprising:

maintaining, on one or more computers, a list of people or addresses that are authorized to receive online presence information of a user based, at least in part, on one or more actions performed by the user on one or more messages received by the user from the person or address, the actions including one or more of (1) saving the one or more messages from the person or address; (2) printing the one or more messages from the person or address; (3) moving the one or more messages from the person or address from an inbox to a folder; and (4) leaving the one or more messages from the person or address open for a predetermined period of time;

accessing, at the one or more computers, online presence information for the user;

determining, at the one or more computers, a potential receiver of the online presence information;

comparing, at the one or more computers, the potential receiver to the list of authorized people or addresses; and determining, at the one or more computers, whether to communicate the online presence information to the potential receiver based on whether the potential receiver is included in the list.

39. The method of claim 38 wherein the folder comprises a folder other than a delete folder or a spam folder.

40. The method of claim 38 wherein maintaining, on one or more computers, the list of people or addresses that are authorized to receive online presence information of the user is further based, at least in part, on detecting user actions that mitigate against factors that otherwise are used to determine the person or address is known to the user.

41. A system of providing online presence information, the system comprising:

a processor of executing a set of instructions; and a storage medium for storing the set of instruction, the instructions including instructions for:

maintaining, on one or more computers, a list of people or addresses that are authorized to receive online presence information of a user based, at least in part, on one or more actions performed by the user on one or more messages received by the user from the person or address, the actions including one or more of (1) saving the one or more messages from the person or address; (2) printing the one or more messages from the person or address; (3) moving the one or more messages from the person or address from an inbox to a folder; and (4) leaving the one or more messages from the person or address open for a predetermined period of time;

accessing, at the one or more computers, online presence information for the user;

determining, at the one or more computers, a potential receiver of the online presence information;

comparing, at the one or more computers, the potential receiver to the list of authorized people or addresses; and determining, at the one or more computers, whether to communicate the online presence information to the potential receiver based on whether the potential receiver is included in the list.

42. The system of claim 41 wherein the folder comprises a folder other than a delete folder or a spam folder.

43. The system of claim 41 wherein maintaining, on one or more computers, the list of people or addresses that are authorized to receive online presence information of the user is further based, at least in part, on detecting user actions that mitigate against factors that otherwise are used to determine the person or address is known to the user.

* * * * *